United States Patent
Maruyama

(10) Patent No.: US 11,882,258 B2
(45) Date of Patent: Jan. 23, 2024

(54) COLOR MANAGEMENT DEVICE, COLOR MANAGEMENT METHOD, AND NON-TRANSITORY RECORDING MEDIUM STORING COMPUTER READABLE PROGRAM

(71) Applicant: Konica Minolta, Inc., Tokyo (JP)

(72) Inventor: Kazuma Maruyama, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/818,059

(22) Filed: Aug. 8, 2022

(65) Prior Publication Data

US 2023/0065985 A1 Mar. 2, 2023

(30) Foreign Application Priority Data

Aug. 30, 2021 (JP) ................................. 2021-140420

(51) Int. Cl.
*H04N 1/60* (2006.01)

(52) U.S. Cl.
CPC ......... *H04N 1/6033* (2013.01); *H04N 1/6008* (2013.01)

(58) Field of Classification Search
CPC ............................ H04N 1/6033; H04N 1/6008

USPC .................................................. 358/1.9, 1.15
See application file for complete search history.

(56) References Cited

U.S. PATENT DOCUMENTS

2012/0250044 A1* 10/2012 Teraue ............... H04N 1/40006
358/1.9
2015/0212770 A1* 7/2015 Song ..................... G06F 3/1222
358/1.15

FOREIGN PATENT DOCUMENTS

JP 2019146038 8/2019

* cited by examiner

*Primary Examiner* — Quang N Vo
(74) *Attorney, Agent, or Firm* — BakerHostetler

(57) ABSTRACT

Even when the number of image formers and/or the number of color management target values are large, it is possible to easily manage the color management target value associated with the image former.
A color management device 1 according to one aspect of the present invention includes a management part 107 that manages information on a user who performs a color verification operation using the color management target value in association with correspondence information in which the image former and the color management target value are managed in association with each other.

9 Claims, 24 Drawing Sheets

| PRINTER | MODEL | SERIAL No. | INSTALLATION BASE | AUTOMATIC COLORIMETRIC FUNCTION (0: Not supported / 1: Supported) |
|---|---|---|---|---|
| Printer A | C6000 | AAAA-BBBB-CCCC-XXX1 | Tokyo | 1 |
| Printer B | C4000 | Custom Target 1 | Tokyo | 0 |
| Printer C | C5000 | Custom Target 1 | Tokyo | 1 |
| Printer D | A2000 | Japan Color 2011 | New York | 0 |
| Printer E | B3100 | G7 Targeted | New York | 0 |
| ⋮ | | | | |

| USER ID | USER NAME | Password | AUTHORITY | Email | BASE |
|---|---|---|---|---|---|
| J-smith | John Smith | ******** | Administrator | j-smith@mail1.com | — |
| Y-taro | YAMADA TARO | ******** | Color Expert | y-taro@mail1.com | Tokyo |
| Y-hanako | YAMADA HANAKO | ******** | Operator | y-hanako@mail1.com | Tokyo |
| J-doe | Jane Doe | ******** | Color Expert | j-doe@mail1.com | New York |
| J-doe2 | John Doe | ******** | Operator | j-doe2@mail1.com | New York |
| ... | | | | | |

| COLOR MANAGEMENT TARGET VALUE NAME | CREATION DATE | CREATOR USER ID | SHARING BETWEEN BASES | CHART | ALLOWABLE VALUE | TARGET VALUE |
|---|---|---|---|---|---|---|
| Custom Target 1 | 2020-07-01 | Y-taro | OFF | Japan Color Control Strip | dE:4.5, dEavg:3, dEmax:6, dChavgCMYgray:3.5 | 94, −0.02, −1.95, ⋯ |
| G7 Targeted | − | Y-taro | OFF | ISO 12647-7 color bar | dE:3, dEavg:2, dEmax:6, dChavgCMYgray:2 | 95, −0.02, −1.96, ⋯ |
| Custom Target 2 | 2020-08-10 | J-doe | OFF | IDEAlliance2013 | dE:3, dEavg:2, dEmax:6, dChavgCMYgray:2 | 95, −0.02, −1.96, ⋯ |
| Japan Color 2011 | − | J-doe | OFF | PSP51 | dEmaxCMY:3.5, DEK:5, dEmaxRGB:4.2, wdLavgCMYgray:1.5, wdLmaxCMYgray:3, wdLavgK:1.5, wdLmaxk:3, wdChavgCMYgray:1.5, wdChmaxCMYgray:3 | 97, −0.01, −1.98, ⋯ |
| ⋯ | | | | | | |

| PRINTER COLOR TRACKING MANAGEMENT INFORMATION | COLOR MANAGEMENT TARGET VALUE NAME | PRINTER NAME | OPERATOR EXECUTION AUTHORITY |
|---|---|---|---|
| COLOR TRACKING INFORMATION 1 | JapanColor TARGET SETTING | Printer A | |
| COLOR TRACKING INFORMATION 2 | Fogra TARGET SETTING | Printer A | |
| COLOR TRACKING INFORMATION 3 | JapanColor TARGET SETTING | Printer B | Y-hanako |
| COLOR TRACKING INFORMATION 4 | Fogra TARGET SETTING | Printer B | Y-hanako |
| COLOR TRACKING INFORMATION 5 | JapanColor TARGET SETTING | Printer C | Y-hanako |
| COLOR TRACKING INFORMATION 6 | Fogra TARGET SETTING | Printer A | Y-hanako |
| COLOR TRACKING INFORMATION 7 | IDEAlliance TargetSetting | Printer A | J-doe2 |
| COLOR TRACKING INFORMATION 8 | G7 wedge TargetSetting | Printer B | |
| COLOR TRACKING INFORMATION 9 | IDEAlliance TargetSetting | Printer B | J-doe2 |
| COLOR TRACKING INFORMATION 10 | G7 wedge TargetSetting | Printer C | |
| ⋮ | | | |

| USER ID | USER NAME | Password | AUTHORITY | Email | BASE | PRINTER COLOR TRACKING MANAGEMENT INFORMATION |
|---|---|---|---|---|---|---|
| J-smith | John Smith | ******** | Administrator | j-smith@mail1.com | – | All |
| Y-taro | YAMADA TARO | ******** | Color Expert | y-taro@mail1.com | Tokyo | All |
| Y-hanako | YAMADA HANAKO | ******** | Operator | y-hanako@mail1.com | Tokyo | COLOR TRACKING INFORMATION 3, COLOR TRACKING INFORMATION 4, COLOR TRACKING INFORMATION 5, COLOR TRACKING INFORMATION 6 |
| J-doe | Jane Doe | ******** | Color Expert | j-doe@mail1.com | New York | New York |
| J-doe2 | John Doe | ******** | Operator | j-doe2@mail1.com | New York | New York |
| ... | | | | | | |

| COLORIMETRIC ID | COLORIMETRIC EXECUTION DATE AND TIME | PRINTER COLOR TRACKING MANAGEMENT INFORMATION | COLORIMETRIC RESULT | COLORIMETER | COLORIMETRIC PERFORMER | COLORIMETRIC VALUE |
|---|---|---|---|---|---|---|
| 108 | 2020-07-09 14:03:00 | COLOR TRACKING INFORMATION 5 | Pass | HANDY TYPE 002 MANUFACTURED BY X | Y-hanako | 93, −0.05, −2.96,⋯ |
| 107 | 2020-07-09 14:00:00 | COLOR TRACKING INFORMATION 3 | Pass | HANDY TYPE 001 MANUFACTURED BY K | Y-hanako | 95, −0.02, −1.96,⋯ |
| 106 | 2020-07-09 12:05:00 | COLOR TRACKING INFORMATION 3 | Fail | HANDY TYPE 001 MANUFACTURED BY K | Y-hanako | 89, −0.01, −1.5,⋯ |
| 105 | 2020-07-09 12:00:00 | COLOR TRACKING INFORMATION 2 | Pass | PRINTER IN-LINE TYPE 001 MANUFACTURED BY K | Y-taro | 88, 0.02, −0.96,⋯ |
| 104 | 2020-07-09 11:58:00 | COLOR TRACKING INFORMATION 8 | Pass | PRINTER IN-LINE TYPE 001 MANUFACTURED BY K | J-doe | 95, −0.01, −1.93,⋯ |
| ⋯ | | | | | | |

| PRINTER COLOR TRACKING MANAGEMENT INFORMATION | COLORIMETRIC ID HISTORY INFORMATION |
|---|---|
| COLOR TRACKING INFORMATION 1 | 93, 94 79,··· |
| COLOR TRACKING INFORMATION 2 | 105, 93 −80,··· |
| COLOR TRACKING INFORMATION 3 | 107, 106, 81,··· |
| COLOR TRACKING INFORMATION 4 | 100, 92 82,··· |
| COLOR TRACKING INFORMATION 5 | 108, 91, 82,··· |
| COLOR TRACKING INFORMATION 6 | 101, 90, 83,··· |
| COLOR TRACKING INFORMATION 7 | 103, 102, 85,··· |
| COLOR TRACKING INFORMATION 8 | 104, 89, 86,··· |
| COLOR TRACKING INFORMATION 9 | 98, 97, 96,··· |
| COLOR TRACKING INFORMATION 10 | 95, 98, 87,··· |

FIG. 10

| | PRINTER COLOR TRACKING MANAGEMENT | COLOR MANAGEMENT TARGET VALUE | PRINTER |
|---|---|---|---|
| ☐ | COLOR TRACKING INFORMATION 3 | JapanColor TARGET SETTING | Printer B |
| ☐ | COLOR TRACKING INFORMATION 34 | Fogra TARGET SETTING | Printer B |
| ☑ | COLOR TRACKING INFORMATION 35 | JapanColor TARGET SETTING | Printer C |
| ☐ | COLOR TRACKING INFORMATION 36 | Fogra TARGET SETTING | Printer C |

PRINTER COLOR TRACKING MANAGEMENT

[COLOR VERIFICATION] [COLORMETRIC HISTORY CONFIRMATION]

Ar1

Sc2

[OK] Bn2
[CANCEL] Bn3

FIG. 11

Sc3 — USER ACCOUNT MANAGEMENT

*: LOGGING IN

Ar3:

| USER ID | USER NAME | AUTHORITY | Email | BASE |
|---|---|---|---|---|
| * J-smith | John Smith | Administrator | j-smith@mail1.com | — |
| J-doe | Jane Doe | Color Expert | j-doe@mail1.com | New York |
| J-doe2 | John Doe | Operator | j-doe2@mail1.com | New York |
| Y-taro | YAMADA TARO | Color Expert | y-taro@mail1.com | Tokyo |
| Y-hanako | YAMADA HANAKO | Operator | y-hanako@mail1.com | Tokyo |

Bn4 [ADD]   Bn5 [DELETE]

Ar4:

| | PRINTER COLOR TRACKING MANAGEMENT | COLOR MANAGEMENT TARGET VALUE | PRINTER |
|---|---|---|---|
| ☐ | COLOR TRACKING INFORMATION 3 | JapanColor TARGET SETTING | Printer B |
| ☐ | COLOR TRACKING INFORMATION 4 | Fogra TARGET SETTING | Printer B |
| ☑ | COLOR TRACKING INFORMATION 5 | JapanColor TARGET SETTING | Printer C |
| ☐ | COLOR TRACKING INFORMATION 6 | Fogra TARGET SETTING | Printer C |

Bn2 [OK]   Bn3 [CANCEL]

FIG. 19

USER ACCOUNT MANAGEMENT — Sc3

*: LOGGING IN

| USER ID | USER NAME | AUTHORITY | Email | BASE |
|---|---|---|---|---|
| * J-smith | John Smith | Administrator | j-smith@mail1.com | — |
| J-doe | | | | New York |
| J-doe2 | | | | New York |

WE HAVE CREATED AN ACCOUNT FOR J-DOE2. — Sc5

THERE IS ONLY ONE PIECE OF PRINTER COLOR TRACKING INFORMATION. WOULD YOU LIKE TO GRANT AUTHORITY TO THIS COLOR TRACKING INFORMATION?

| PRINTER COLOR TRACKING MANAGEMENT | PRINTER | Printer A |
|---|---|---|
| COLOR TRACKING INFORMATION 2 | COLOR MANAGEMENT TARGET VALUE | Fogra TARGET SETTING |

[ YES ] Bn6  [ NO ] Bn7

PRINTER COLOR TRACKING MANAG... / COLOR TRACK... INFORMATIO...

[ OK ] Bn2   [ CANCEL ] Bn3

FIG. 20

| COLORIMETRIC ID | COLORIMETRIC EXECUTION DATE AND TIME | PRINTER COLOR TRACKING MANAGEMENT | COLORIMETRIC RESULT | COLORIMETER | PERFORMER | COLORIMETRIC VALUE |
|---|---|---|---|---|---|---|
| 108 | 2020-08-09 SUN | COLOR TRACKING INFORMATION 5 | Pass | HANDY TYPE 002 MANUFACTURED BY X | Y-hanako | 93,-0.05,-2.96,... |
| 107 | 2020-08-09 SUN | COLOR TRACKING INFORMATION 3 | Pass | HANDY TYPE 001 MANUFACTURED BY K | Y-hanako | 95,-0.02,-1.96,... |
| 106 | 2020-08-09 SUN | COLOR TRACKING INFORMATION 3 | Fail | HANDY TYPE 001 MANUFACTURED BY K | Y-hanako | 89,-0.01,-1.5,... |
| 105 | 2020-08-09 SUN | COLOR TRACKING INFORMATION 2 | Pass | PRINTER IN-LINE TYPE 001 MANUFACTURED BY K | Y-taro | 88,0.02,-0.96,... |
| 104 | 2020-08-08 SAT | COLOR TRACKING INFORMATION 8 | Pass | PRINTER IN-LINE TYPE 001 MANUFACTURED BY K | J-doe | 95,-0.01,-1.93,... |
| ⋮ | | | | | | |
| 95 | 2020-08-06 THU | COLOR TRACKING INFORMATION 3 | Pass | HANDY TYPE 001 MANUFACTURED BY K | Y-hanako | ... |
| ⋮ | | | | | | |
| 91 | 2020-08-05 WED | COLOR TRACKING INFORMATION 3 | Pass | HANDY TYPE 001 MANUFACTURED BY K | Y-hanako | ... |
| ⋮ | | | | | | |
| 89 | 2020-08-04 TUE | COLOR TRACKING INFORMATION 3 | Pass | HANDY TYPE 001 MANUFACTURED BY K | Y-hanako | ... |
| ⋮ | | | | | | |
| 83 | 2020-08-03 MON | COLOR TRACKING INFORMATION 3 | Pass | HANDY TYPE 001 MANUFACTURED BY K | Y-hanako | ... |
| ⋮ | | | | | | |
| 77 | 2020-08-02 SUN | COLOR TRACKING INFORMATION 3 | Pass | HANDY TYPE 001 MANUFACTURED BY K | Y-hanako | ... |
| 78 | 2020-08-02 SUN | COLOR TRACKING INFORMATION 3 | Fail | HANDY TYPE 001 MANUFACTURED BY K | Y-hanako | ... |
| ⋮ | | | | | | |
| 74 | 2020-08-01 SAT | COLOR TRACKING INFORMATION 3 | Pass | HANDY TYPE 001 MANUFACTURED BY K | Y-hanako | ... |
| ⋮ | | | | | | |
| 63 | 2020-07-30 THU | COLOR TRACKING INFORMATION 3 | Pass | HANDY TYPE 001 MANUFACTURED BY K | Y-hanako | ... |
| ⋮ | | | | | | |
| 59 | 2020-07-29 WED | COLOR TRACKING INFORMATION 3 | Pass | HANDY TYPE 001 MANUFACTURED BY K | Y-hanako | ... |
| ⋮ | | | | | | |
| 44 | 2020-07-26 SUN | COLOR TRACKING INFORMATION 3 | Pass | HANDY TYPE 001 MANUFACTURED BY K | Y-hanako | ... |
| 43 | 2020-07-26 SUN | COLOR TRACKING INFORMATION 3 | Fail | HANDY TYPE 001 MANUFACTURED BY K | Y-hanako | ... |
| ⋮ | | | | | | |

| TENDENCY NOTIFICATION SCHEDULER | | | | | | | | | | | | | | | |
|---|---|---|---|---|---|---|---|---|---|---|---|---|---|---|---|
| DAY OF WEEK | MON | TUE | WED | THU | FRI | SAT | SUN | MON | TUE | WED | THU | FRI | SAT | SUN | ... |
| COLOR TRACKING INFORMATION | | | | | | | 3 | | | | | | | 3 | ... |

Sd

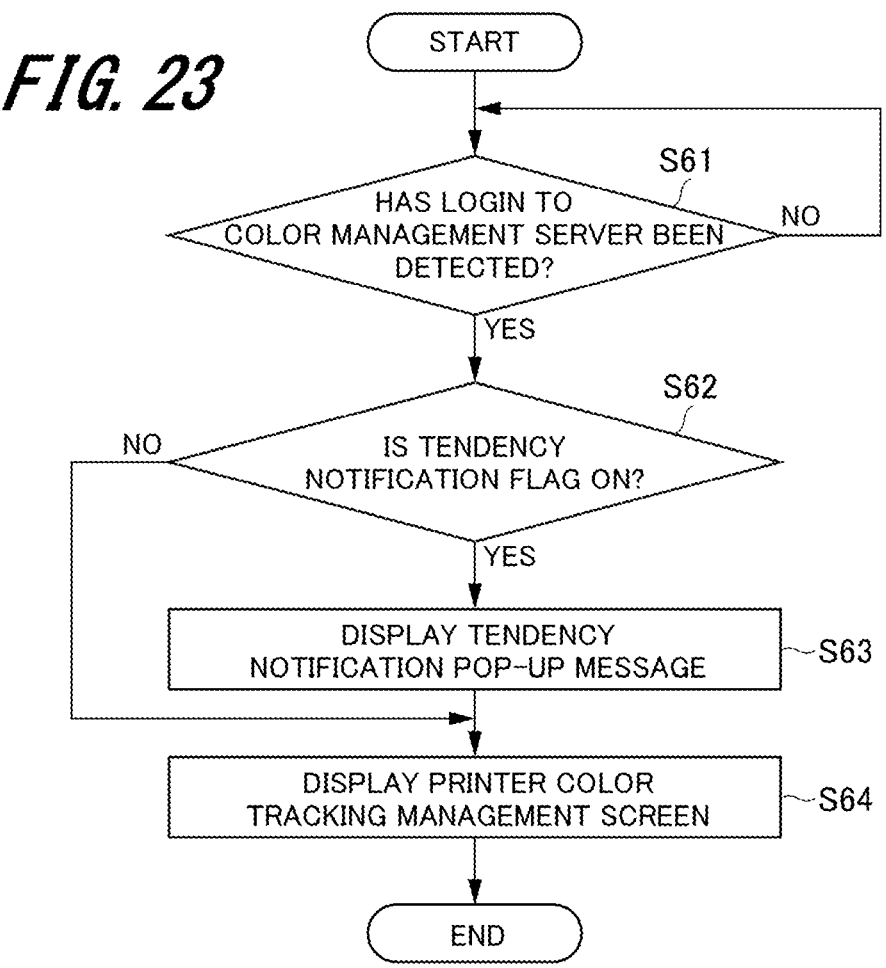

FIG. 24

COLOR MANAGEMENT

| LATEST COLORIMETRIC RESULT | PRINTER COLOR TRACKING MANAGEMENT | PRINTER | COLOR MANAGEMENT TARGET VALUE | COLORIMETRIC ID | LAST COLORIMETRIC EXECUTION DATE AND TIME |
|---|---|---|---|---|---|
| ✓ | | | | | 2020-08-09 SUN |
| ✓ | | | | | 2020-08-09 SUN |
| ✓ | | | | | 2020-08-09 SUN |
| ✓ | | | | | 2020-08-08 SAT |
| ✗ | | | | | NO COLORIMETRIC HISTORY |
| ✗ | | | | | NO COLORIMETRIC HISTORY |

WELCOME, HANAKO YAMADA.

"COLOR TRACKING INFORMATION 3" MAY NOT PASS CURRENTLY. COLOR ADJUSTMENT OF THE MACHINE IS RECOMMENDED BEFORE PERFORMING COLOR VERIFICATION.

| PRINTER COLOR TRACKING MANAGEMENT | COLOR MANAGEMENT TARGET VALUE | PRINTER |
|---|---|---|
| COLOR TRACKING INFORMATION 3 | JapanColor TARGET SETTING | Printer B |

HAVE A GOOD DAY

COLOR MANAGEMENT DEVICE, COLOR MANAGEMENT METHOD, AND NON-TRANSITORY RECORDING MEDIUM STORING COMPUTER READABLE PROGRAM

CROSS-REFERENCE TO RELATED APPLICATIONS

This application claims priority to Japanese patent Application No. 2021-140420, filed on Aug. 30, 2021, the entire disclosure of which is incorporated herein by reference.

BACKGROUND

Technological Field

The present invention relates to a color management device, a color management method, and a non-transitory recording medium storing a computer readable program.

Description of the Related Art

In a printing company, before printed matter is printed by an image former, a chart (or a wedge) that is a document in which patches for color adjustment are arranged in a matrix state is printed on a sheet, and the color of the printed chart is measured by a colorimeter. Then, the printing company checks whether the color measured by the colorimeter satisfies a color management target value as a predetermined reference, thereby managing output quality of a plurality of image formers owned by the company. Examples of the color management target value include those defined by standardization organizations such as Japan Color, Idealliance, Fogra, or ISO, as well as those defined by the printing company itself, and the color management target value is represented by a Lab value and the like.

When performing color management of the image former based on the color management target value, a person in charge of the color management in the printing company sets the color management target value first. As the color management target value, an allowable range of a difference between a colorimetric value or a calculation result of the colorimetric value and a target value (a prescribed value) is often set.

After setting the color management target value, a person in charge of the image former prints the chart using the image former managed by the person in charge, and measures the color of (measures) the printed chart using the colorimeter. Thereafter, the person in charge of the color management or the person in charge of the image former checks whether a colorimetric result by the colorimeter satisfies the color management target value also by performing a calculation as necessary.

Patent Literature 1 discloses a printer that includes an information processor that manages each of a plurality of printing bases including at least one printer, and is included in a color management system that manages the color of an image printed by the printer in each printing base, and in the printer, when it is determined that a change in color management setting includes a change related to a first setting, whether printing with the change in the setting is possible is determined, and when it is determined that the printing is not possible, a warning is issued.

RELATED ART LITERATURE

Patent Literature

Patent Literature 1: JP 2019-146038 A

SUMMARY

Incidentally, the printing company usually owns the plurality of image formers, and each of the plurality of image formers needs to perform printing satisfying the color management target value. Therefore, it is considered that the color management of the image former can be efficiently performed by managing the color management target value in association with the image former.

However, the management of the color management target value associated with the image former becomes more complicated as the number of image formers increases, and as the number of color management target values increases. For example, it is assumed that the number of image formers owned by a printing company is three, and there are five types of sheets handled by each image former. Since a color tone reproduced in an output from the image former varies depending on the type of sheet and the model of the image former, in this case, the total number of color management target values is required to be 15.

In addition, in a case where the color management is performed in an environment where the color management can be seamlessly used among the plurality of bases of the printing company, the number of image formers and the number of color management target values both increase, and thus the management of the color management target value associated with the image former becomes more difficult.

The present invention has been made in view of such a situation, and an object of the present invention is to enable easy management of the color management target value associated with the image former even when the number of image formers and/or the number of color management target values are large.

In order to solve at least one of the above problems, a color management device reflecting one aspect of the present invention is a color management device that performs color management associating a color management target value as a reference to be satisfied by a colorimetric result by a colorimeter with at least one image former. The color management device reflecting one aspect of the present invention includes a management part that manages information on a user who performs a color verification operation using the color management target value in association with correspondence information in which the image former and the color management target value are managed in association with each other.

In addition, a color management method reflecting one aspect of the present invention is a color management method by a color management device that performs color management associating a color management target value as a reference to be satisfied by a colorimetric result by a colorimeter with at least one image former. The color management method reflecting one aspect of the present invention includes managing information on a user who performs a color verification operation using the color management target value in association with correspondence information in which the image former and the color management target value are managed in association with each other.

In addition, a program reflecting one aspect of the present invention is a program that can be executed by a computer constituting a color management device that performs color management associating a color management target value as a reference to be satisfied by a colorimetric result by a colorimeter with at least one image former. The program reflecting one aspect of the present invention causes a computer to perform managing information on a user who performs a color verification operation using the color management target value in association with correspondence information in which the image former and the color management target value are managed in association with each other.

Problems, configurations, and effects other than those described above will be clarified by the following description of embodiments.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2 is a diagram illustrating a configuration example of a printer information table according to an embodiment of the present invention;

FIG. 3 is a diagram illustrating a configuration example of a user information table according to an embodiment of the present invention;

FIG. 4 is a diagram illustrating a configuration example of a color management target value table according to an embodiment of the present invention;

FIG. 5 is a diagram illustrating a configuration example of a printer color tracking management information table according to an embodiment of the present invention;

FIG. 6 is a diagram illustrating a configuration example of a user information table to which an item managing printer color tracking management information is added according to an embodiment of the present invention;

FIG. 7 is a diagram illustrating a configuration example of colorimetric history data according to an embodiment of the present invention;

FIG. 8 is a diagram illustrating a configuration example of printer color tracking information-colorimetric information correspondence data according to an embodiment of the present invention;

FIG. 10 is a diagram illustrating a configuration example of a printer color tracking management screen displayed when logging in with operator authority according to an embodiment of the present invention;

FIG. 11 is a diagram illustrating a configuration example of a user account management screen according to an embodiment of the present invention;

FIG. 19 is a diagram illustrating a configuration example of a user account management screen on which a pop-up screen is displayed according to a second modification of the present invention;

FIG. 20 is a diagram illustrating a configuration example of colorimetric history data according to the second modification of the present invention;

FIG. 21 is a diagram illustrating a configuration example of a tendency notification scheduler according to the second modification of the present invention;

FIG. 23 is a flowchart illustrating an example of a procedure of a tendency notification method (2) by the color management server according to the second modification of the present invention; and FIG. 24 is a diagram illustrating an example of a printer color tracking management screen on which a tendency notification pop-up message is displayed according to the second modification of the present invention.

DETAILED DESCRIPTION OF EMBODIMENTS

Figure 1:
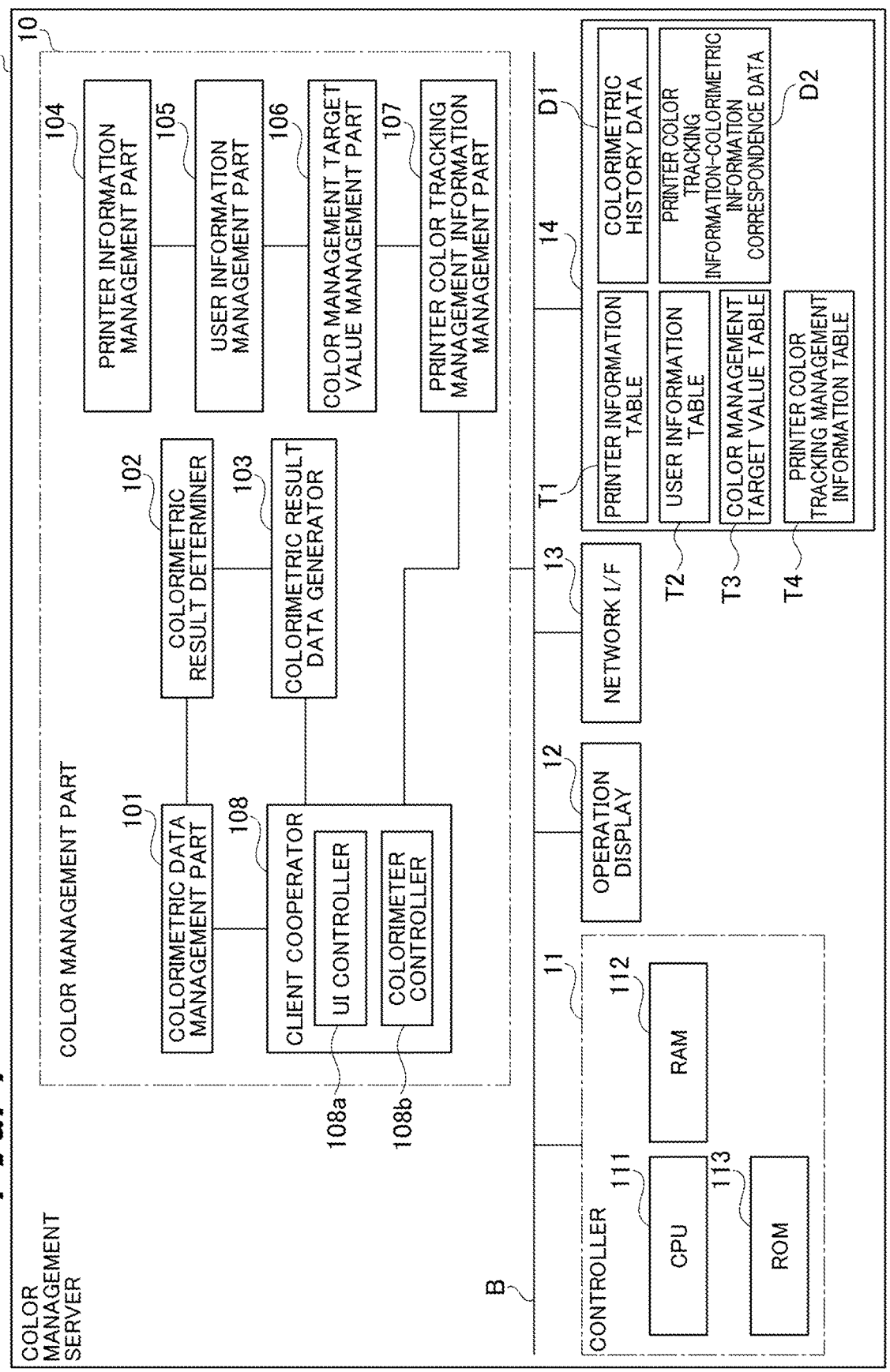
FIG. 1 is a block diagram illustrating a configuration example of a control system of a color management server according to an embodiment of the present invention.

Hereinafter, exemplary embodiments for carrying out the present invention will be described with reference to the accompanying drawings. In the present specification and the drawings, components having substantially the same function or configuration are denoted by the same reference numerals, and overlapping description of the components is omitted.

<Configuration of Color Management Server>

First, a configuration example of a control system of a color management server 1 according to the present embodiment will be described with reference to FIG. 1. FIG. 1 is a block diagram illustrating the configuration example of the control system of the color management server 1 according to the present embodiment.

The color management server 1 is connected to a plurality of printers (an example of image formers) (not illustrated) and a client personal computer (PC) via a network (not illustrated). In the present embodiment, information on a color management target value as a reference to be satisfied by a colorimetric result by a colorimeter (not illustrated) and information on the printers are managed in association with each other in a printer color tracking management information table T4 as printer color tracking management information (an example of correspondence information). Further, in the present embodiment, the printer color tracking management information is managed in association with information on an operator (an example of users) who performs a color verification operation such as printing of a chart and colorimetry of printed matter.

As illustrated in FIG. 1, the color management server 1 (an example of color management devices) includes a color management part 10, a controller 11, an operation display 12, a network interface (I/F) 13, and a storage 14. The color management part 10 and the controller 11, the operation display 12, the network I/F 13, and the storage 14 are communicably connected to each other via a system bus B.

The color management part 10 includes a colorimetric data management part 101, a colorimetric result determiner 102, a colorimetric result data generator 103, a printer information management part 104, a user information management part 105, a color management target value management part 106, a printer color tracking management information management part 107, and a client cooperator 108.

The colorimetric data management part 101 manages a correspondence relationship between the plurality of printers (not illustrated) and the color management target value. The information on the plurality of printers is managed by the printer information management part 104, and the information on the color management target value is managed by the color management target value management part 106.

The colorimetric result determiner 102 determines whether a measurement result of a chart by a measuring instrument (not illustrated) falls within an allowable range of an error from a target value defined in the color management target value.

A determination result by the colorimetric result determiner 102 is recorded in colorimetric history data D1. The colorimetric history data D1 will be described later with reference to FIG. 7.

The colorimetric result data generator 103 uses the determination result by the colorimetric result determiner 102 to generate display data that a user interface (UI) controller 108a causes a browser of the client PC (not illustrated) connected to the color management server 1 to display.

The printer information management part 104 manages the information on the printers using a printer information table T1. The printer information table T1 will be described in detail with reference to FIG. 2.

The user information management part 105 manages information regarding the user such as a user name and authority granted to the user using a user information table T2. The user information table T2 will be described in detail with reference to FIG. 3 described later.

The color management target value management part 106 manages information related to the color management target value such as a name of the color management target value and a creation date of the color management target value using a color management target value table T3. The color management target value table T3 will be described in detail with reference to FIG. 4 described later.

The printer color tracking management information management part 107 (an example of management parts) manages the printer color tracking management information in which the printers and the color management target value are associated with each other and correspondence information with the operator using the printer color tracking management information table T4. The printer color tracking management information table T4 will be described in detail with reference to FIG. 5 described later.

Further, the printer color tracking management information management part 107 manages the printer color tracking management information and history information of the colorimetric result of the printed matter by the printer managed in the printer color tracking management information using the colorimetric history data D1 and printer color tracking information-colorimetric information correspondence data D2. The colorimetric history data D1 will be described in detail with reference to FIG. 7 described later, and the printer color tracking information-colorimetric information correspondence data D2 will be described in detail with reference to FIG. 8 described later.

The client cooperator 108 performs processing related to cooperation with the client PC (not illustrated) of a printing company connected via the network I/F 13. The client cooperator 108 includes the UI controller 108a and a colorimeter controller 108b.

For example, the UI controller 108a performs control to cause a browser that is a UI of the client PC to display the colorimetric result by the colorimeter, information on each table stored in the storage 14, a screen for registering or changing data in each table, and the like.

The colorimeter controller 108b controls an operation of the colorimeter (not illustrated) connected to each of the plurality of printers. Specifically, the colorimeter controller 108b transmits a control signal instructing a start or an end of colorimetry to the colorimeter, or obtains the colorimetric result by the colorimeter to output it to the storage 14.

The controller 11 includes a central processing unit (CPU) 111, a random access memory (RAM) 112, and a read only memory (ROM) 113. The CPU 111 reads various programs such as a system program and a color management program stored in the ROM 113, develops the programs in the RAM 112, and controls an operation of each unit of the color management server 1 according to the developed programs. The color management part 10 described above is a functional unit implemented by the CPU 111 reading and executing the programs.

The RAM 112 forms a work area for temporarily storing various programs executed by the CPU 111 and data related to these programs, and stores setting contents and the like for various operations related to color management in the work area.

The ROM 113 includes a nonvolatile memory such as a semiconductor memory, and stores a system program corresponding to the color management server 1, a color management program executable on the system program, and the like. These programs are stored in a form of a program code readable by a computer, and the CPU 211 sequentially executes operations according to the program code. In other words, the ROM 113 is used as an example of a non-transitory recording medium storing a computer readable program that is executed by the computer.

The operation display 12 is configured as, for example, a touch panel in which a display (not illustrated) including a liquid crystal display (LCD), an organic electroluminescence (EL), and the like and an operation inputter (not illustrated) including a touch sensor and the like are integrally formed. Note that in the present embodiment, an example in which the display and the operation inputter are integrally formed as the operation display 12 has been described, but the present invention is not limited thereto. The display and the operation inputter including a keyboard, a mouse, and the like may be separately configured. Alternatively, in addition to the operation display 12 configured as the touch panel, the operation inputter including the keyboard, the mouse, and the like may be provided.

The network I/F 13 controls various data transmission/reception operations performed between each printer and the client PC of the printing company connected via the network (not illustrated).

The storage 14 includes, for example, a hard disk drive (HDD), a solid state drive (SSD), and the like. The storage 14 stores the printer information table T1, the user information table T2, the color management target value table T3, the printer color tracking management information table T4, the colorimetric history data D1, the printer color tracking information-colorimetric information correspondence data D2, and the like.

<Configuration of Printer Information Table>

Next, a configuration of the printer information table T1 managed by the printer information management part 104 (see FIG. 1) of the color management server 1 will be described with reference to FIG. 2. FIG. 2 is a diagram illustrating a configuration example of the printer information table T1.

As illustrated in FIG. 2, the printer information table T1 includes fields of "Printer", "Model", "Serial No.", "Installation Base", and "Automatic Colorimetric Function".

The "Printer" field stores a name of the printer owned by the printing company. In the printer information table T1, the "Printer" field stores five printer names "Printer A" to "Printer E". The "Model" field stores a model name of the printer having the printer name stored in the "Printer" field.

The "Serial No." field stores a serial number of the printer having the printer name stored in the "Printer" field. The "Installation Base" field stores a name of a base where the printer having the printer name stored in the "Printer" field is installed as "Tokyo" and "New York".

The "Automatic Colorimetric Function" field stores information ("0" or "1") indicating whether the printer having the printer name stored in the "Printer" field has an automatic colorimetric function.

"0: Not Supported" indicates that there is no automatic colorimetric function, and "1: Supported" indicates that there is an automatic colorimetric function.

For example, the first row of the printer information table T1 indicates that the model of the printer having the printer name "Printer A" is "C6000", the serial number is "AAAA-BBBB-CCCC-XXX1", the installation base is "Tokyo", and the automatic colorimetric function is "1" (supported).

<Configuration of User Information Table>

Next, a configuration of the user information table T2 managed by the user information management part 105 (see FIG. 1) will be described with reference to FIG. 3. FIG. 3 is a diagram illustrating a configuration example of the user information table T2.

As illustrated in FIG. 3, the user information table T2 includes fields of "User ID", "User Name", "Password", "Authority", "Email", and "Base". The "User ID" field stores information on a user ID as an identifier of the user, and the "User Name" field stores a name of the user. The "Password" field stores information on a password that needs to be input when the user logs in to the color management server 1.

The "Authority" field stores information on authority in a color management operation granted to each user. In the example illustrated in FIG. 3, the authority includes three types: "Administrator", "Color Expert", and "Operator."

The "Administrator" is authority granted to an administrator who can perform all operations including registration of the user (an account) in the color management server 1. The "Color Expert" is authority granted to a color manager and the like who perform the color management operation. The color manager performs an authorization operation of the operator for the printer color tracking management information, efficiency improvement of the color management operation through the authorization operation and the like, management of color quality of the company, and the like. The "Operator" is authority granted to the operator who performs the color verification operation such as printing of the chart and colorimetry of the printed matter for verifying whether the color of the printed matter satisfies the color management target value.

The "Email" field stores an email address of the user. The "Base" field stores information on a base which the user belongs to (works in).

For example, the first row of the user information table T2 indicates that the user ID is "J-smith", the password of the user whose user name is "John Smith" is "********", and the authority granted to the user is "Administrator". Further, it is indicated that the email address of this user is "j-smith@mail1.com", and the base information is "-" (not belonging to the base).

<Configuration of Color Management Target Value Table>

Next, a configuration of the color management target value table T3 managed by the color management target value management part 106 (see FIG. 1) of the color management server 1 will be described with reference to FIG. 4. FIG. 4 is a diagram illustrating a configuration example of the color management target value table T3.

As illustrated in FIG. 4, the color management target value table T3 includes fields of "Color Management Target Value", "Creation Date", "Creator User ID", "Sharing between Bases", "Chart", "Allowable Value", and "Target Value".

The "Color Management Target Value" field stores the name of the color management target value. The "Creation Date" field stores information on a creation date in a case where the color management target value is a custom color management target value generated in the printing company in a format of "YYYY-MM-DD".

The "Creator User ID" field stores a user ID of a creator of the custom color management target value in a case where the color management target value is the custom color management target value generated in the printing company. The "Sharing between Bases" field stores information indicating whether a setting that enables the color management target value to be shared between the bases is enabled or disabled. "ON" is stored in the case of being enabled, and "OFF" is stored in the case of being disabled.

The "Chart" field stores a name of the chart used to confirm whether color satisfying the color management target value has been reproduced. The names of the charts include preset color management target values established by standardization organizations such as Japan Color and Idealliance, or names of the custom color management target values created by printing company C itself.

The "Allowable Value" field stores values indicating an allowable range of a deviation in a case where the deviation from the target value (a prescribed value) indicated by a Lab value and the like occurs. For example, "dE:3", which is an allowable value d associated with "Customer Target 1" of the color management target value, indicates that a deviation amount allowed by the Lab value obtained by the CIE DE2000 color difference formula is "3" or less, and "dEavg: 2" indicates that a deviation amount allowed by an average value (avg) of the Lab values obtained by the CIE DE2000 color difference formula is "2" or less.

The "Target Value" field stores values of the target values (the prescribed values) indicated by three values of "L", "a", and "b" in the Lab values. The three values "L", "a", and "b" are provided for the number of patches constituting the chart.

For example, the first row of the color management target value table T3 indicates that the creation date of "Customer Target 1" of the color management target value is "2020-07-01", the user ID of the creator is "Y-taro", and the setting of the sharing between the bases is "OFF". In addition, it is indicated that the chart name of the color management target value is "Japan Color Control Strip", the allowable value is "dE:4.5, dEavg:3, dEmax:6, dCavgCMYgray:3.5", and the target value is "94(L), −0.02(a), −1.95(b)".

<Configuration of Printer Color Tracking Management Information Table>

Next, the printer color tracking management information table T4 managed by the printer color tracking management information management part 107 (see FIG. 1) will be described with reference to FIG. 5. FIG. 5 is a diagram illustrating a configuration example of the printer color tracking management information table T4.

As illustrated in FIG. 5, the printer color tracking management information table T4 includes fields of "Printer Color Tracking Management Information", "Color Management Target Value", "Printer Name", and "Operator Execution Authority".

The "Printer Color Tracking Management Information" field stores a name of the printer color tracking management information. The "Color Management Target Value" field stores the name of the color management target value. The "Printer Name" field stores the name of the printer.

The "Operator Execution Authority" field stores a name of the operator who performs the color verification operation such as printing of the chart and colorimetry of the printed matter for confirm whether the color of the printed matter satisfies the color management target value. The "Operator Execution Authority" field is blank when no operator is assigned for the printer color tracking management information. The assignment of the operator for the printer color tracking management information is performed via a printer color tracking management screen Sc1 illustrated in FIG. 9 described later. The printer color tracking management screen Sc1 will be described in detail with reference to FIG. 9.

For example, the first row of the printer color tracking management information table T4 indicates that, in the printer color tracking management information named "Color Tracking Information 1," the color management target value named "JapanColor Target Setting" and the printer named "Printer A" are managed. Further, it is indicated that operator execution authority has not been granted to the printer color tracking management information named "Color Tracking Information 1" yet.

Further, in the example illustrated in FIG. 5, the operator having the user ID "Y-hanako" is granted authority to handle "Color Tracking Information 3" to "Color Tracking Information 6", and the operator having the user ID "J-doe2" is granted authority to handle "Color Tracking Information 7" and "Color Tracking Information 9". In other words, a plurality of pieces of the printer color tracking management information is assigned to one operator.

Note that in the example illustrated in FIG. 5, the operator execution authority is managed (set) in items of the printer color tracking management information table T4, but the present invention is not limited thereto. For example, the printer color tracking management information that can be handled by the operator may be managed in the user information table T2 (see FIG. 1).

FIG. 6 is a diagram illustrating a configuration example of a user information table T2' to which an item managing the printer color tracking management information has been added. The user information table T2' (an example of the correspondence information) illustrated in FIG. 6 is obtained by adding the item of "Printer Color Tracking Management Information" to the user information table T2 illustrated in FIG. 3. In this way, correspondence information between the printer color tracking management information and the user can be managed using the user information table T2'. Registration or a change of information in the user information table T2' is performed via a user account management screen Sc3 illustrated in FIG. 11 described later. The user account management screen Sc3 will be described in detail with reference to FIG. 11.

<Configuration of Colorimetric History Data>

Next, a configuration of the colorimetric history data D1 will be described with reference to FIG. 7. FIG. 7 is a diagram illustrating a configuration example of the colorimetric history data D1.

As illustrated in FIG. 7, the colorimetric history data D1 includes fields of "Colorimetric ID", "Colorimetric Execution Date and Time", "Printer Color Tracking Management Information", "Colorimetric Result", "Colorimeter", "Colorimetric Performer", and "Colorimetric Value".

The "Colorimetric ID" field stores an ID assigned to each colorimetric job. The "Colorimetric Execution Date and Time" field stores a date and time when colorimetry by the colorimeter is performed in a format of "YYYY-MM-DD HH:MM:SS". The "Printer Color Tracking Management Information" field stores a name of the printer color tracking management information.

The "Colorimetric Result" field stores a value of "Pass" or "Fail" indicating a colorimetric result obtained by the colorimetric result determiner 102 (see FIG. 1). "Pass" indicates that a colorimetric value falls within a range of an allowable value of the target value, and "Fail" indicates that the colorimetric value exceeds the range of the allowable value of the target value. The "Colorimeter" field stores a name of the colorimeter, and the "Colorimetric Performer" field stores a user ID of the operator who has performed the colorimetry. The "Colorimetric Value" field stores the colorimetric values acquired by the colorimeter.

For example, the first row of the colorimetric history data D1 indicates that the execution date and time of the colorimetric job having the colorimetric ID "108" is "2020-07-09 14:03:00", the printer color tracking management information is "Color Tracking Information 5", and the colorimetric result is "Pass". In addition, it is indicated that the name of the colorimeter that has performed the colorimetry is "Handy Type 002 Manufactured by X", the colorimetric performer is a user whose user ID is "Y-hanako", and the colorimetric values are "93, −0.05, −2.96, . . . ". Each row constituting the colorimetric history data D1 corresponds to one colorimetry (colorimetric job).

<Configuration of Printer Color Tracking Information-Colorimetric Information Correspondence Data>

Next, the printer color tracking information-colorimetric information correspondence data D2 will be described with reference to FIG. 8. FIG. 8 is a diagram illustrating a configuration example of the printer color tracking information-colorimetric information correspondence data D2.

As illustrated in FIG. 8, the printer color tracking information-colorimetric information correspondence data D2 includes fields of "Printer Color Tracking Management Information" and "Colorimetric ID History Information". The "Printer Color Tracking Management Information" field stores a name of the printer color tracking management information. The "Colorimetric ID History Information" field stores colorimetric IDs of the colorimetric result of the chart in which the color management target value managed in the printer color tracking management information is set.

In the printer color tracking information-colorimetric information correspondence data D2 illustrated in FIG. 8, each row corresponds to one colorimetry (colorimetric job) similarly to the colorimetric history data D1 illustrated in FIG. 7.

For example, the first row of the printer color tracking information-colorimetric information correspondence data D2 indicates that the colorimetric IDs associated with the printer color tracking management information of "Color Tracking Information 1" are "93", "94", "79", . . . . As described above, since the printer color tracking management information and information of the colorimetric ID are associated with each other, it is possible to easily refer to past data of a colorimetric history associated with the colorimetric ID and create a graph and the like using the printer color tracking management information.

<Configuration of Printer Color Tracking Management Screen>

Figure 9:
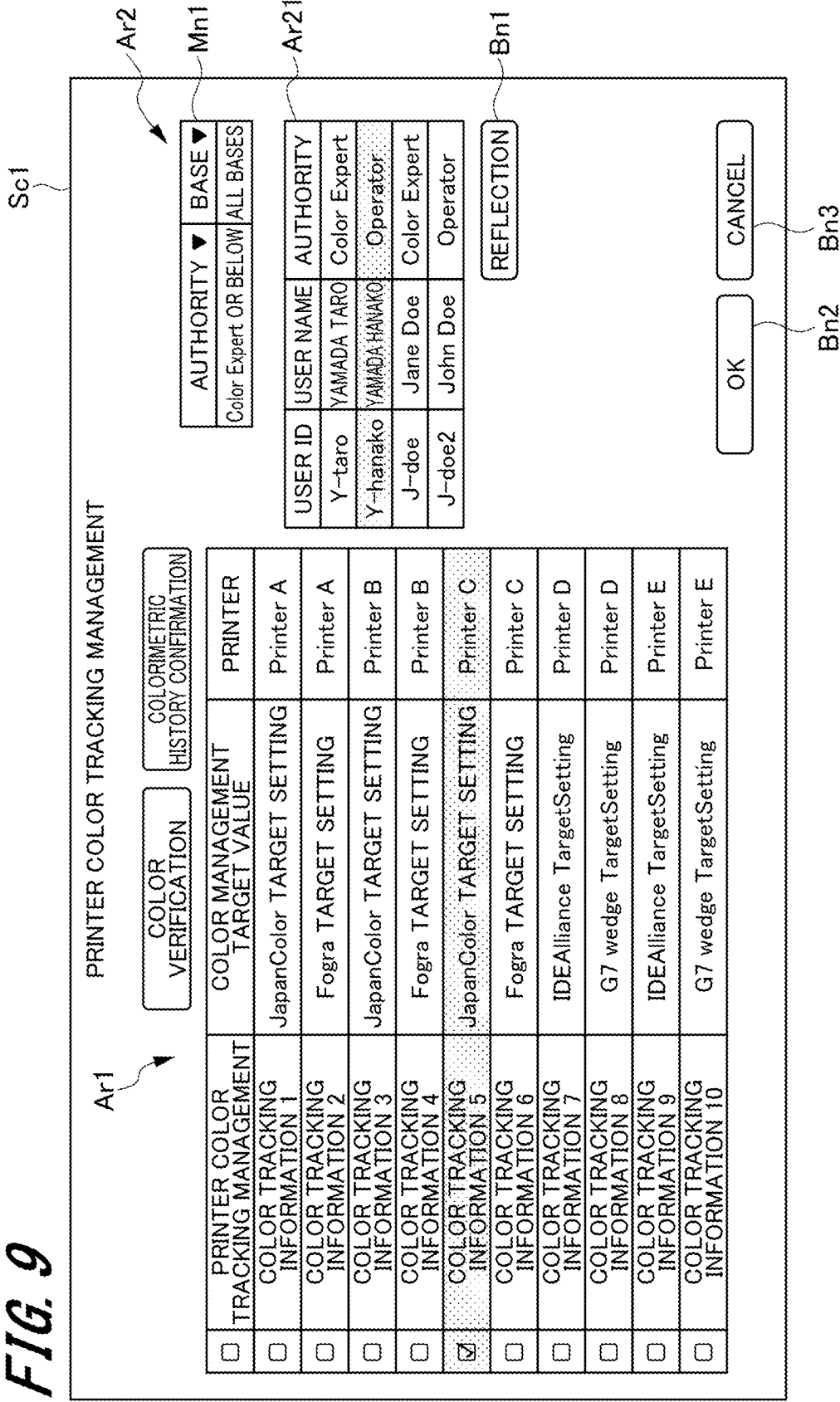
FIG. 9 is a diagram illustrating a configuration example of a printer color tracking management screen according to an embodiment of the present invention.

Next, a configuration of the printer color tracking management screen Sc1 that assigns the user (the operator) for the printer color tracking management information will be described with reference to FIG. 9. FIG. 9 is a diagram illustrating a configuration example of the printer color tracking management screen Sc1.

As illustrated in FIG. 9, the printer color tracking management screen Sc1 includes a printer color tracking management information selector Ar1, a user selector Ar2, a reflection button Bn1, an OK button Bn2, and a cancel button Bn3.

The printer color tracking management information selector Ar1 includes check boxes and items of "Printer Color Tracking Management", "Color Management Target Value", and "Printer". The item of "Printer Color Tracking Management" indicates the name of the printer color tracking management information, the item of "Color Management Target Value" indicates the name of the color management target value, and the item of "Printer" indicates the name of the printer.

The association of the operator with the printer color tracking management information is performed by, for example, the administrator having the authority of "Administrator" and the color manager having the authority of "Color Expert". Which user is selected as the operator (an operator selection method) can be appropriately set for each printing company, for example, a person in charge of managing the printers associated with the color management target value or a person in charge who is familiar with the color management target value.

The user selector Ar2 includes an authorization menu Mn1 and a user information display Ar21. The authorization menu Mn1 includes a pull-down list of "Authorization" and a pull-down list of "Base". The pull-down list of "Authority" is a list from which execution authority of the user desired to be displayed in the list can be selected, and the pull-down list of "Base" is a list from which the base of the user desired to be displayed in the list can be selected.

The user information display Ar21 includes items of "User ID", "User Name", and "Authority". The user ID is indicated in the item of "User ID", and the user name is indicated in the item of "User Name". The item of "Authority" indicates information of the execution authority granted to the user such as "Color Expert" and "Operator".

The color manager (or the administrator) can associate the selected printer color tracking information with the selected user (operator) by selecting the printer color tracking information with which the operator is desired to be associated in the printer color tracking management information selector Ar1 of the printer color tracking management screen Sc1, selecting the user desired to be associated with the printer color tracking information in the user selector Ar2, and pressing the reflection button Bn1.

Then, the color manager can confirm the association between the printer color tracking management information and the operator by pressing the OK button Bn2. On the other hand, the color manager can cancel the association between the printer color tracking management information and the operator by pressing the cancel button Bn3.

In the example illustrated in FIG. 9, the user having the user ID "Y-hanako" is associated with "Color Tracking Information 5". By performing such an operation, execution authority for the color verification operation (hereinafter may be simply referred to as "operation") using the color management target value of "JapanColor Target Setting" and the printer having the printer name "Printer C" is granted to the user having the user ID "Y-hanako".

FIG. 10 is a diagram illustrating a configuration example of a printer color tracking management screen Sc2 displayed when logging in with operator authority. The printer color tracking management screen Sc2 (an example of correspondence information display screens) illustrated in FIG. 10 includes the printer color tracking management information selector Ar1, the OK button Bn2, and the cancel button Bn3.

When the user granted the operator authority logs in, only the printer color tracking management information associated with the user is displayed on the printer color tracking management screen Sc2. Then, the user can print the chart using the selected printer color tracking management information, perform the color verification operation such as the colorimetry, display a history of the colorimetric result, and the like by tracking the printer color tracking management information subjected to printing of the chart and the colorimetry and pressing the OK button Bn2.

FIG. 10 illustrates an example of a case where the user having the user ID "Y-hanako" logs in.

The printer color tracking management information of "Color Tracking Information 3" to "Color Tracking Information 6" is associated with the user ID "Y-hanako" in the printer color tracking management information table T4 illustrated in FIG. 5. Therefore, also on the printer color tracking management screen Sc2 illustrated in FIG. 10, only the printer color tracking management information of "Color Tracking Information 3" to "Color Tracking Information 6" associated with the user ID "Y-hanako" is displayed.

By performing such control, the operator can easily select arbitrary printer color tracking management information from among the printer color tracking management information to which the execution authority is granted. Further, since printer color tracking management information for which the execution authority is not granted to the user is not displayed on the printer color tracking management screen Sc2, it is possible to prevent printer color tracking management information for which another user has the execution authority from being disclosed to the user who logs in.

<Configuration of User Account Management Screen>

Next, a user account management screen on which user information can be added to, changed in, or deleted from the user information table T2' (see FIG. 6) to which an item managing the printer color tracking management information has been added will be described with reference to FIG. 11. FIG. 11 is a diagram illustrating a configuration example of the user account management screen Sc3.

As illustrated in FIG. 11, the user account management screen Sc3 includes a user selector Ar3, an add button Bn4, a delete button Bn5, a printer color tracking management information selector Ar4, the OK button Bn2, and the cancel button Bn3.

The user selector Ar3 includes items of "User ID", "User Name", "Authority", "Email", and "Base". The user ID is indicated in the item of "User ID", and the user name is indicated in the item of "User Name". The item of "Authority" indicates information on the authority granted to the user such as "Administrator", "Color Expert", and "Operator". The email address of the user is indicated in the item of "Email", and the information of the base which the user belongs to is indicated in the item of "Base".

The printer color tracking management information selector Ar4 includes items of "Printer Color Tracking Management Information", "Color Management Target Value", and "Printer". The name of the printer color tracking management information is indicated in the item of "Printer Color Tracking Management Information", the name of the color management target value is indicated in the item of "Color Management Target Value", and the name of the printer is indicated in the item of "Printer".

The add button Bn4 is a button to be pressed when a new user is added to the user selector Ar3. The delete button Bn5 is a button to be pressed when correspondence information between the user account and the printer color tracking management information is deleted from the user information table T2'.

The color manager can associate the selected printer color tracking information with the selected user (operator) by selecting the user who is desired to be newly associated with the printer color tracking information or for which the association is desired to be changed in the user selector Ar3 of the user account management screen Sc3, selecting the printer color tracking information with which the operator is desired to be associated or for which the association is desired to be changed in the printer color tracking management information selector Ar4, and pressing the reflection button Bn1.

Then, the color manager can confirm the association between the printer color tracking management information and the operator by pressing the OK button Bn2. On the other hand, the color manager can cancel the association between the printer color tracking management information and the operator by pressing the cancel button Bn3.

When the add button Bn4 is pressed, correspondence information between the printer color tracking management information and the operator confirmed by pressing the OK button Bn2 is added to the user information table T2'. On the other hand, when the delete button Bn5 is pressed, the correspondence information between the printer color tracking management information and the operator confirmed by pressing the OK button Bn2 is deleted from the user information table T2'.

According to the present embodiment, since the color manager manages the printer color tracking management information and the operator in association with each other, the color management target value associated with the printer can be easily managed even when the number of printers and/or the number of color management target values are large. Then, the color manager adjusts a correspondence relationship between the printer color tracking management information and the operator using the color management server 1 of the present embodiment, so that the operator can easily improve operation efficiency and manage the color quality of the company.

For example, in the printing company, an operator may be employed on a one-time basis at a time when a large amount of printing needs to be performed. In such a case, management of the operator can be easily and reliably performed by setting an expiration date in the execution authority of the color verification operation performed on the basis of the printer color tracking management information of the company for each operator who is employed on a one-time basis.

Figure 12:
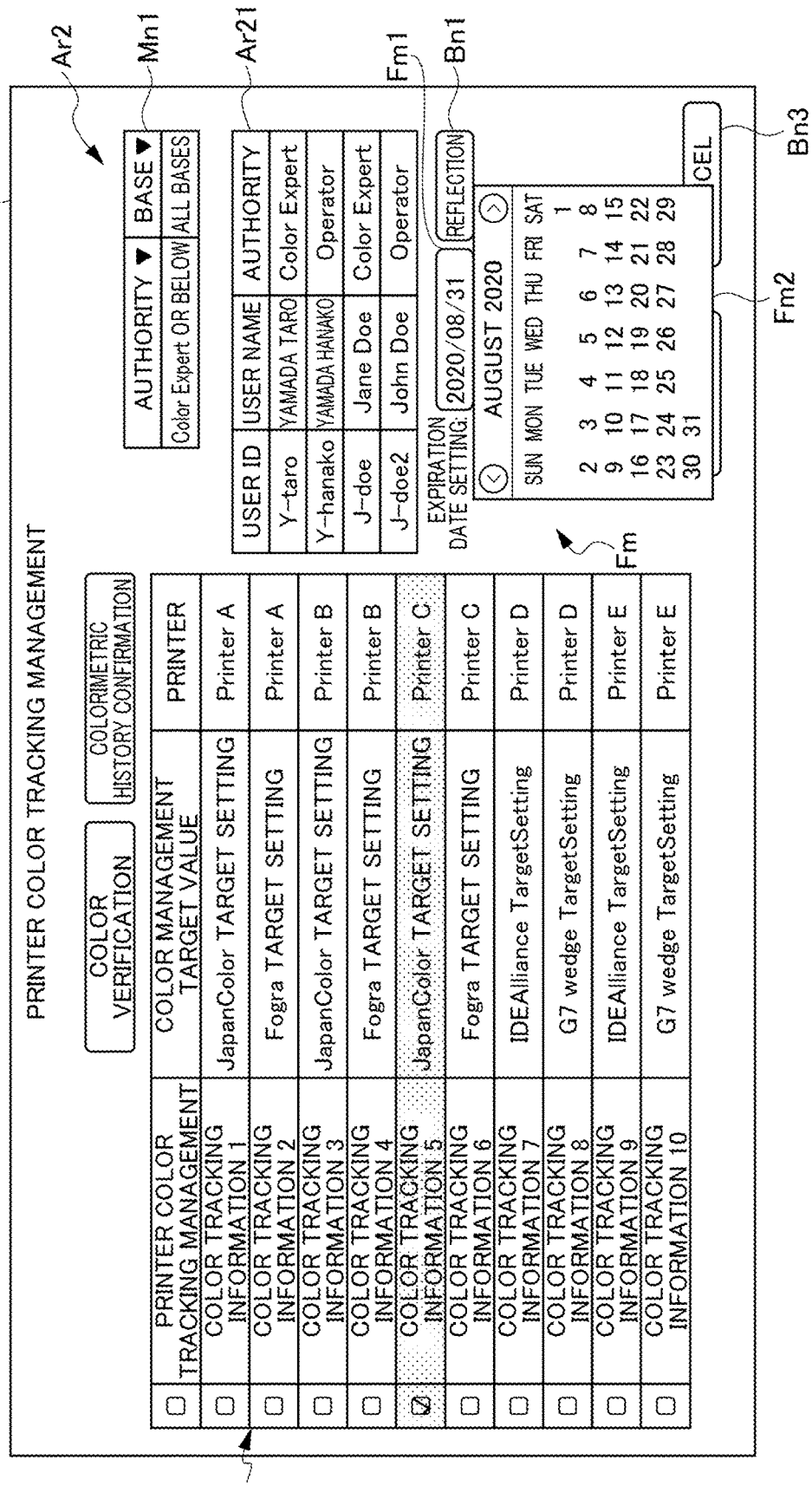
FIG. 12 is a diagram illustrating a configuration example of a printer color tracking management screen capable of granting an expiration date to execution authority granted to an operator according to an embodiment of the present invention.

FIG. 12 is a diagram illustrating a configuration example of a printer color tracking management screen Sc4 capable of granting the expiration date to the execution authority granted to the operator. The printer color tracking management screen Sc4 illustrated in FIG. 12 is obtained by adding a date input form Fm, which is an interface for setting the expiration date, to the printer color tracking management screen Sc1 illustrated in FIG. 9.

The date input form includes a date input field Fm1 and a calendar display field Fm2. The calendar display field Fm2 is displayed by selecting the date input field Fm 1. The color manager can set the expiration date (an end date) of the execution authority to be granted to the operator by inputting a date to the date input field Fm1 or selecting a date from the calendar display field Fm2.

When the expiration date set in this way arrives, the authority set to the operator is removed. In other words, the user ID registered in the item "Operator Execution Authority" is deleted from the printer color tracking management information table T4 (see FIG. 5). Further, in the case of the user information table T2' (see FIG. 6), the printer color tracking management information registered in the item "Printer Color Tracking Management Information" is deleted. Therefore, even in an operation form in which the operator is replaced in a short period of time, the management of the operator can be reliably performed, and the information on the color management target value can be prevented from being erroneously disclosed to a user whose employment term has expired.

<Color Management Method by Color Management Server>

Figure 13:
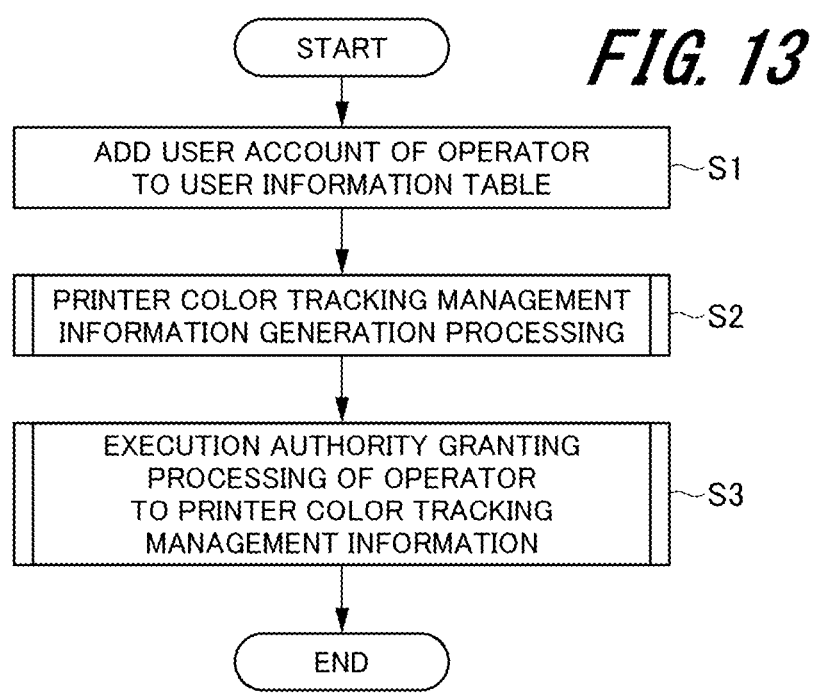
FIG. 13 is a flowchart illustrating an example of a procedure of color management processing by the color management server according to an embodiment of the present invention.

Next, a color management method of the color management server 1 will be described with reference to FIG. 13. FIG. 13 is a flowchart illustrating an example of a procedure of color management processing by the color management server 1.

First, the user account of the operator is added to the user information table T2 (see FIG. 3) (or the user information table T2' (see FIG. 6)) on the basis of an operation by the administrator (step S1).

Next, printer color tracking management information generation processing is performed (step S2). The printer color tracking management information generation processing in step S2 will be described in detail with reference to FIG. 14 described next. Next, processing of granting the execution authority of the operator to the printer color tracking management information is performed (step S3).

Figure 15:
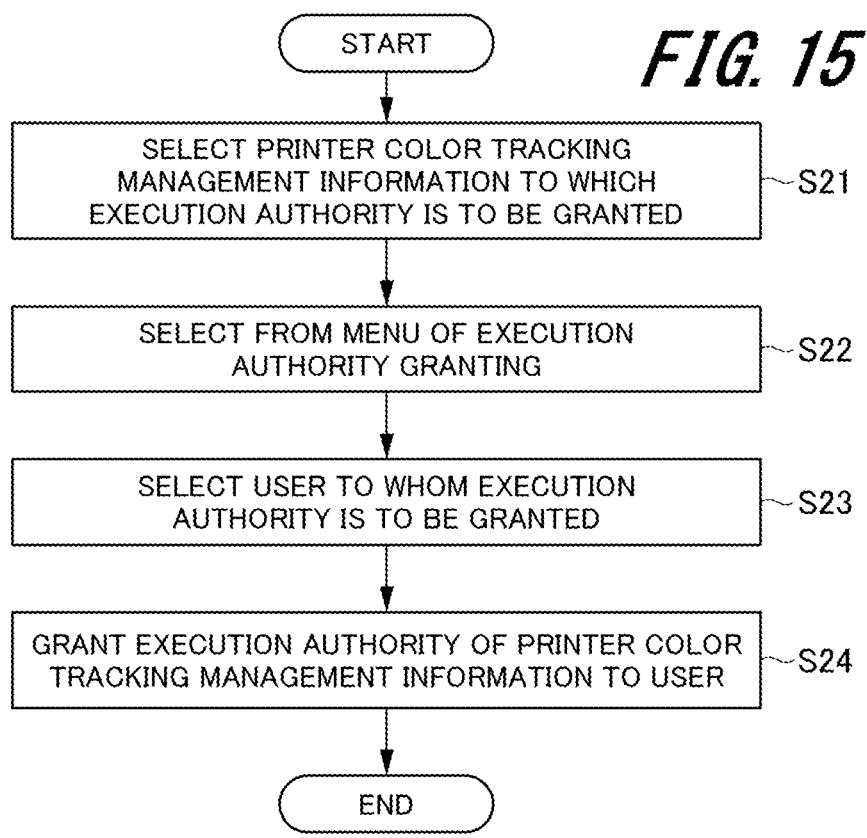
FIG. 15 is a flowchart illustrating an example of a procedure of execution authority granting processing of the operator according to an embodiment of the present invention.

Execution authority granting processing of the operator in step S3 will be described in detail with reference to FIG. 15.

Figure 14:
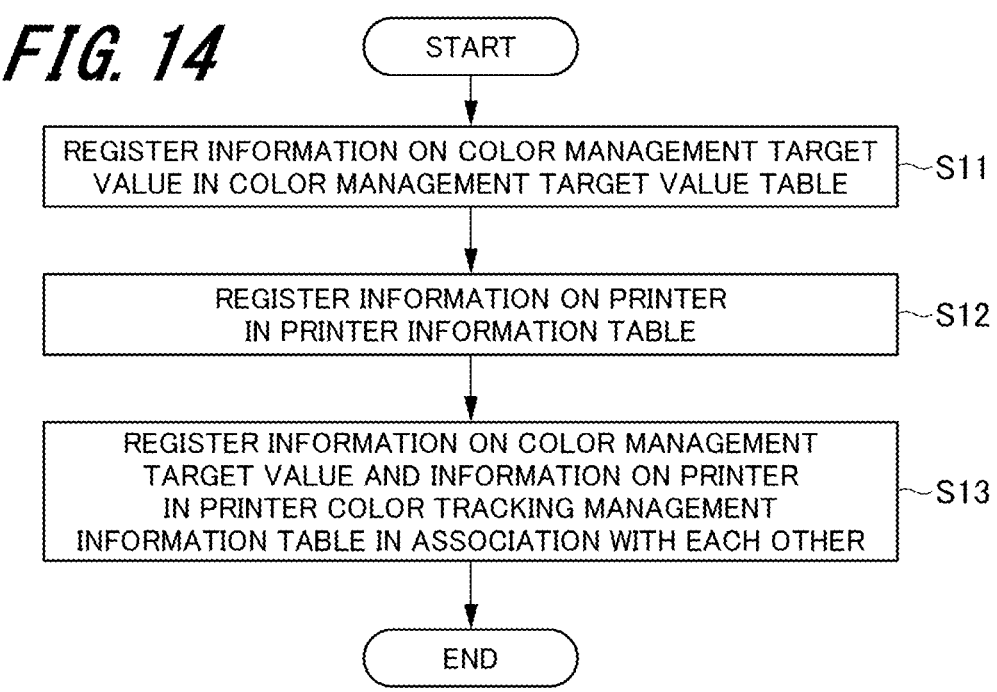
FIG. 14 is a flowchart illustrating an example of a procedure of printer color tracking management information generation processing according to an embodiment of the present invention.

Next, the printer color tracking management information generation processing in step S2 of FIG. 13 will be described with reference to FIG. 14. FIG. 14 is a flowchart illustrating an example of a procedure of the printer color tracking management information generation processing. First, the information on the color management target value is registered in the color management target value table T3 (see FIG. 4) on the basis of an operation by the color manager and the like (step S11).

Next, the information on the printer is registered in the printer information table T1 (see FIG. 2) on the basis of the operation by the color manager and the like (step S12). Note that either the processing in step S11 or the processing in step S12 may be performed first.

Next, the information on the color management target value and the information on the printer are registered in the printer color tracking management information table T4 in association with each other on the basis of the operation by the color manager and the like (step S13). After the processing in step S13, the printer color tracking management information generation processing by the color management server 1 ends.

Next, the execution authority granting processing of the operator in step S3 of FIG. 13 will be described with reference to FIG. 15. FIG. 15 is a flowchart illustrating an example of a procedure of the execution authority granting processing of the operator.

First, the printer color tracking management information to which the execution authority is to be granted is selected on the printer color tracking management screen Sc1 (see FIG. 9) on the basis of the operation by the color manager and the like (step S21). In the example illustrated in FIG. 9, "Color Tracking Information 5", in which "JapanColor Target Setting" of the color management target value and "Printer C" are associated with each other is selected.

Next, the authority to be authorized is selected from the authorization menu Mn on the basis of the operation by the color manager and the like (step S22). In the example illustrated in FIG. 9, "Color Expert or Below" is selected.

Next, the user to whom the execution authority is to be granted is selected on the printer color tracking management screen Sc1 on the basis of the operation by the color manager and the like (step S23). In the example illustrated in FIG. 9, the user having the user ID "Y-hanako" is selected.

Next, when the reflection button Bn1 and the OK button Bn2 on the printer color tracking management screen Sc1 are pressed by the color manager and the like, the execution authority of the printer color tracking management information selected in step S21 is granted to the user selected in step S23 (step S24). After the processing in step S24, the execution authority granting processing of the operator by the color management server 1 ends.

Figure 16:
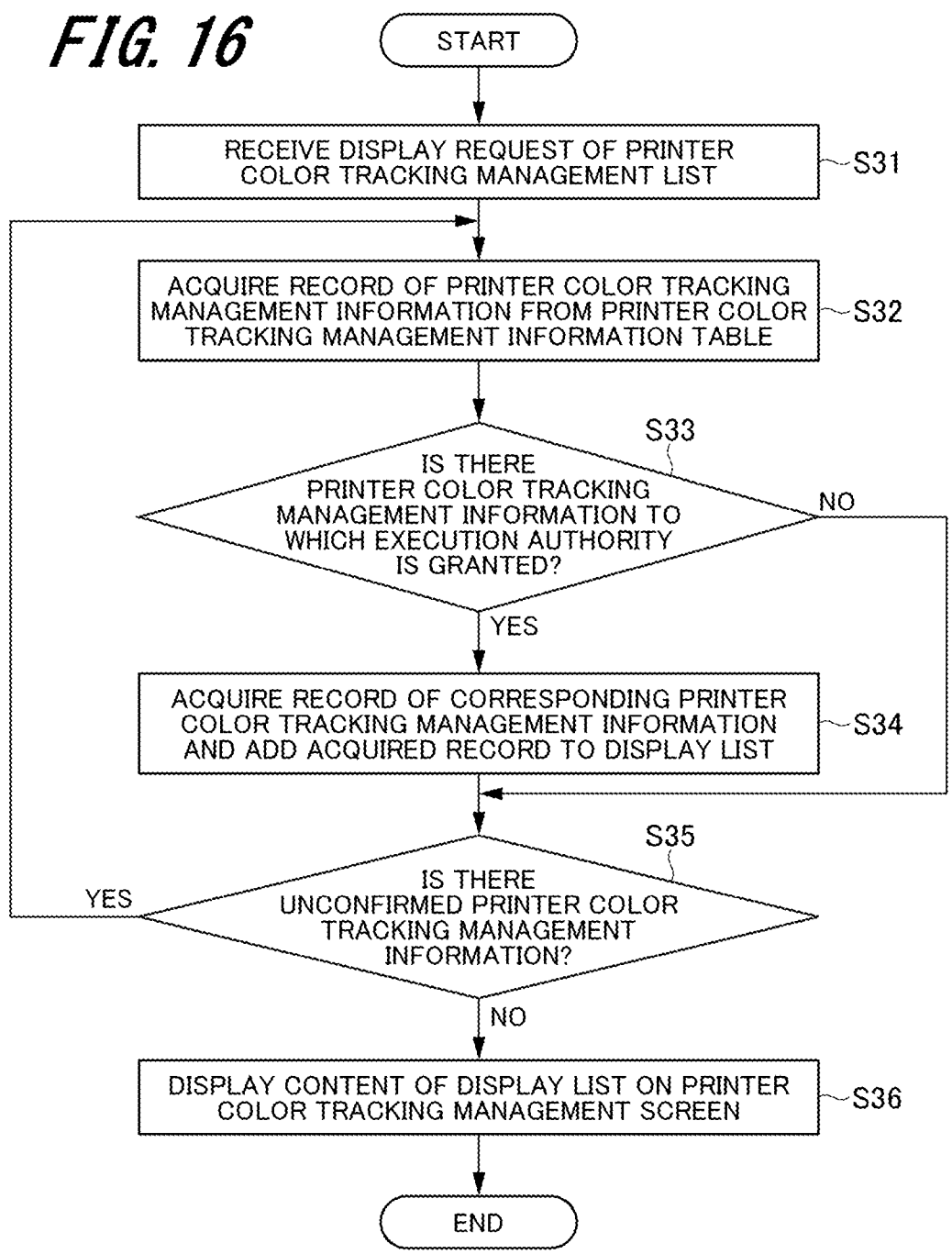
FIG. 16 is a flowchart illustrating an example of a procedure of display processing of the printer color tracking management information according to an embodiment of the present invention.

Next, display processing of the printer color tracking management information will be described with reference to FIG. 16. FIG. 16 is a flowchart illustrating an example of a procedure of the display processing of the printer color tracking management information. First, the printer color tracking management information management part 107 (see FIG. 1) of the color management server 1 receives a display request of a printer color tracking management list from the user (step S31).

Next, the printer color tracking management information management part 107 acquires a record of the printer color tracking management information associated with the user from the printer color tracking management information table T4 (see FIG. 5) (step S32). Next, the printer color tracking management information management part 107 determines whether there is printer color tracking management information to which the execution authority of the user who has made the display request of the list is granted in the printer color tracking management information table T4 (step S33).

When it is determined in step S33 that there is corresponding printer color tracking management information (in a case where a determination in step S33 is YES), the printer color tracking management information management part 107 acquires a record of the corresponding printer color tracking management information and adds the acquired record to a display list (not illustrated) (step S34). The display list is a list temporarily stored in the RAM 112 (see FIG. 1) and the like. For example, when the user who has made the display request of the list is the user having the user ID "Y-hanako", the printer color tracking management information management part 107 selects a record of "Color Tracking Information 3" associated with the user ID "Y-hanako" from the printer color tracking management information table T4 (see FIG. 5) and adds the record to the display list.

Next, the printer color tracking management information management part 107 determines whether there is unconfirmed printer color tracking management information (step S35). For example, since there is other printer color tracking management information associated with the user ID "Y-hanako" in addition to "Color Tracking Information 3", in this case, a determination in step S35 is YES. When the determination in step S35 is YES, the printer color tracking management information management part 107 returns to step S32 and makes a determination. As a result, "Color Tracking Information 4" to "Color Tracking Information 6", which are the printer color tracking management information associated with the user ID "Y-hanako", are also acquired one by one.

On the other hand, in a case where it is determined in step S33 that there is no printer color tracking management information to which the execution authority of the user is granted (in a case where the determination in step S33 is NO), the determination in step S35 is made. In other words, whether there is unconfirmed printer color tracking management information is determined.

When it is determined in step S35 that there is no unconfirmed printer color tracking management information (in a case where the determination in step S35 is NO), the printer color tracking management information management part 107 extracts the printer color tracking management information added to the display list and displays the printer color tracking management information on the printer color tracking management screen Sc2 (see FIG. 10) (step S36). By performing this processing, "Color Tracking Information 3" to "Color Tracking Information 6", which are the printer color tracking management information associated with the user ID "Y-hanako", are displayed on the printer color tracking management screen Sc2. After the processing in step S36, the display processing of the printer color tracking management information ends.

Figure 17:
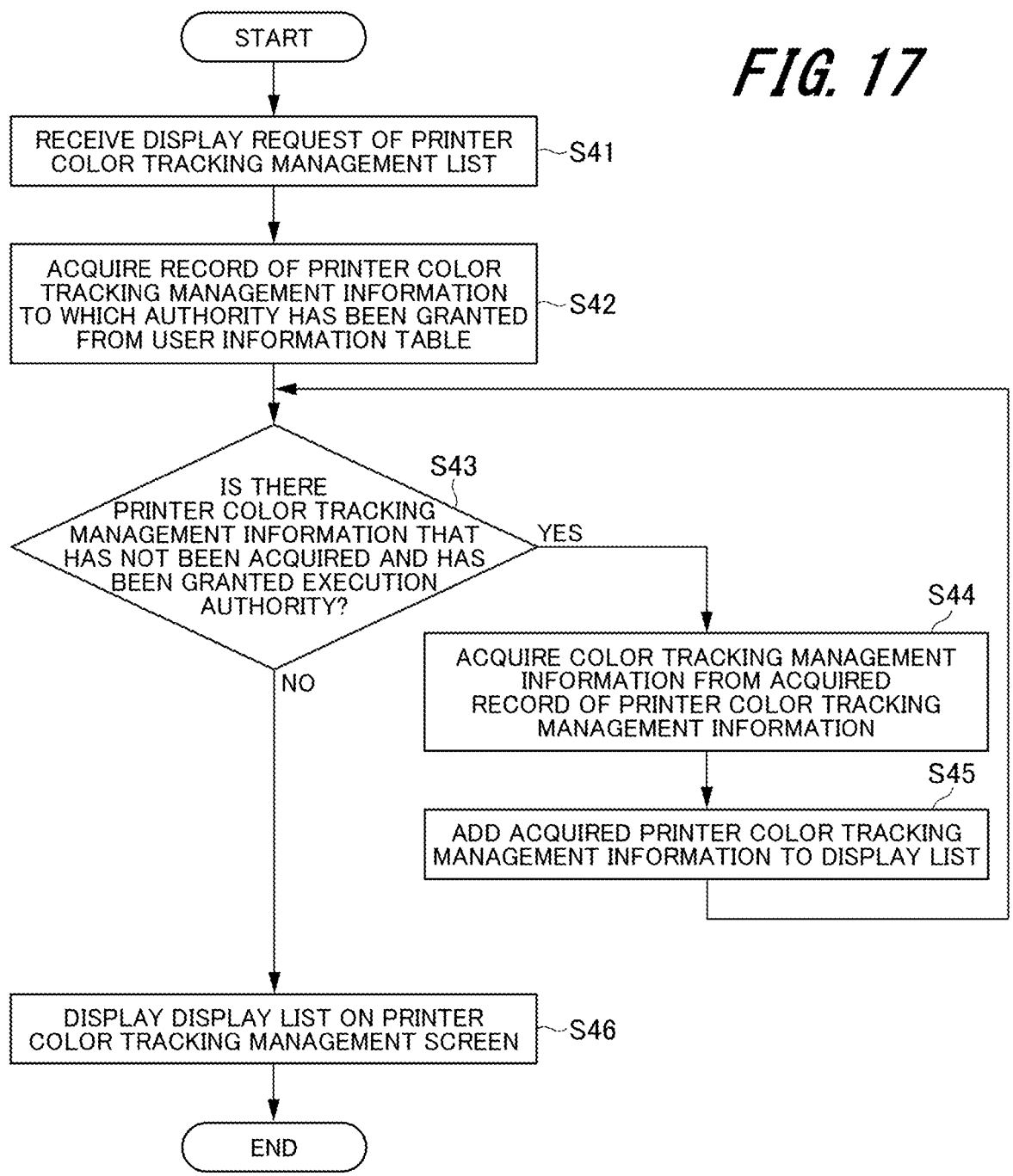
FIG. 17 is a flowchart illustrating an example of a procedure of display processing of the printer color tracking management information in a case where information of color tracking management information is managed in the user information table according to an embodiment of the present invention.

FIG. 17 is a flowchart illustrating an example of a procedure of the display processing of the printer color tracking management information in a case where the information on the color tracking management information is managed in the user information table T2' (see FIG. 6).

First, the printer color tracking management information management part 107 of the color management server 1 receives the display request of the printer color tracking management list from the user (step S41). Next, the printer color tracking management information management part 107 acquires the record of the printer color tracking management information to which the execution authority of the user has been granted from the user information table T2' (step S42).

In the example illustrated in FIG. 6, a record including the user ID "Y-hanako" is extracted from the user information table T2' (see FIG. 6) by performing the processing in step S42.

Next, the printer color tracking management information management part 107 determines whether there is printer color tracking management information that has not been acquired and has been granted the execution authority (step S43). When it is determined in step S43 that there is unacquired printer color tracking management information (in a case where a determination in step S43 is YES), the printer color tracking management information management part 107 acquires color tracking management information associated with the user ID from the record of the printer color tracking management information acquired in step S42 (step S44). For example, the printer color tracking management information management part 107 acquires the record of "Color Tracking Information 3" from the printer color tracking management information associated with the user ID "Y-hanako".

Next, the printer color tracking management information management part 107 adds the printer color tracking management information acquired in step S44 to the display list (not illustrated) (step S45). After the processing in step S45, the printer color tracking management information management part 107 returns to step S43 and makes a determination.

When it is determined in step S43 that there is no printer color tracking management information that has not been acquired and has been granted the authority (in a case where a determination in step S43 is NO), the printer color tracking management information management part 107 displays the printer color tracking management information added to the display list on the printer color tracking management screen Sc2 (see FIG. 10) (step S46). After the processing in step S46, the display processing of the printer color tracking management information by the printer color tracking management information management part 107 ends.

In the embodiment described above, the printer color tracking management information management part 107 manages the information on the user (the operator) who performs the color verification operation using the color management target value in association with the printer color tracking management information that is correspondence information with the printer. Therefore, according to the present embodiment, since the color management target value and the information on the printer can be managed on the basis of the information on the user, it is possible to easily manage the color management target value associated with the printer even when the number of printers and/or the number of color management target values are large.

Further, in the embodiment described above, when there are a plurality of color management target values for which the user performs the color verification operation, the printer color tracking management information management part 107 manages the plurality of pieces of the printer color tracking management information in association with the user. Therefore, according to the present embodiment, even when the number of printers and/or the number of color management target values are large, it is possible to easily manage the color management target value associated with the printer.

Further, in the embodiment described above, the printer color tracking management information management part 107 performs control to display only the printer color tracking management information associated with the user on the printer color tracking management screen Sc2 (see FIG. 10) displaying the printer color tracking management information. Therefore, according to the present embodiment, it is possible to prevent the printer color tracking management information from being erroneously viewed by a user who is not managed in association with the printer color tracking management information.

For example, even in an environment where users in a plurality of bases of the printing company can access the color management server 1, according to the present embodiment, it is possible to prevent information such as the color management target value and information such as know-how managed by the color management server 1 from being leaked to operator in other base.

Further, in the embodiment described above, the printer color tracking management information management part 107 manages the expiration date in association with the user, and does not display the printer color tracking management information associated with the user on the printer color tracking management screen Sc2 (see FIG. 10) for a user who logs in to the color management device 1 at the time when the expiration date has passed. Therefore, according to the present embodiment, it is possible to prevent information managed by the color management server 1 from being leaked to the operator and the like who have left the company even in a case where the operation form in which the operator is replaced in a short period of time is adopted in the printing company.

Additionally, in the embodiment described above, the printer color tracking management information management part 107 manages the printer color tracking management information and the history information of the colorimetric result of the printed matter by the printer managed in the printer color tracking management information using the printer color tracking information-colorimetric information correspondence data D2 (see FIG. 8). Therefore, according to the present embodiment, it is possible to easily refer to the past data of the colorimetric history associated with the colorimetric ID and create a graph and the like by using the printer color tracking management information.

<Various Modifications>

Note that the present invention is not limited to the embodiments described above, and it is obvious that other various application examples and modifications can be taken without departing from the gist of the present invention described in the claims.

[First Modification]

For example, in the embodiment described above, an example in which a plurality of pieces of the printer color tracking management information exists has been described, but the present invention is not limited thereto. For example, when only one piece of printer color tracking management information is registered at the time of creating a new user account, the printer color tracking management information management part 107 may automatically associate the printer color tracking management information with the newly added user account. In other words, the execution authority of the operation related to the printer color tracking management information may be granted to the newly added user account.

Figure 18:
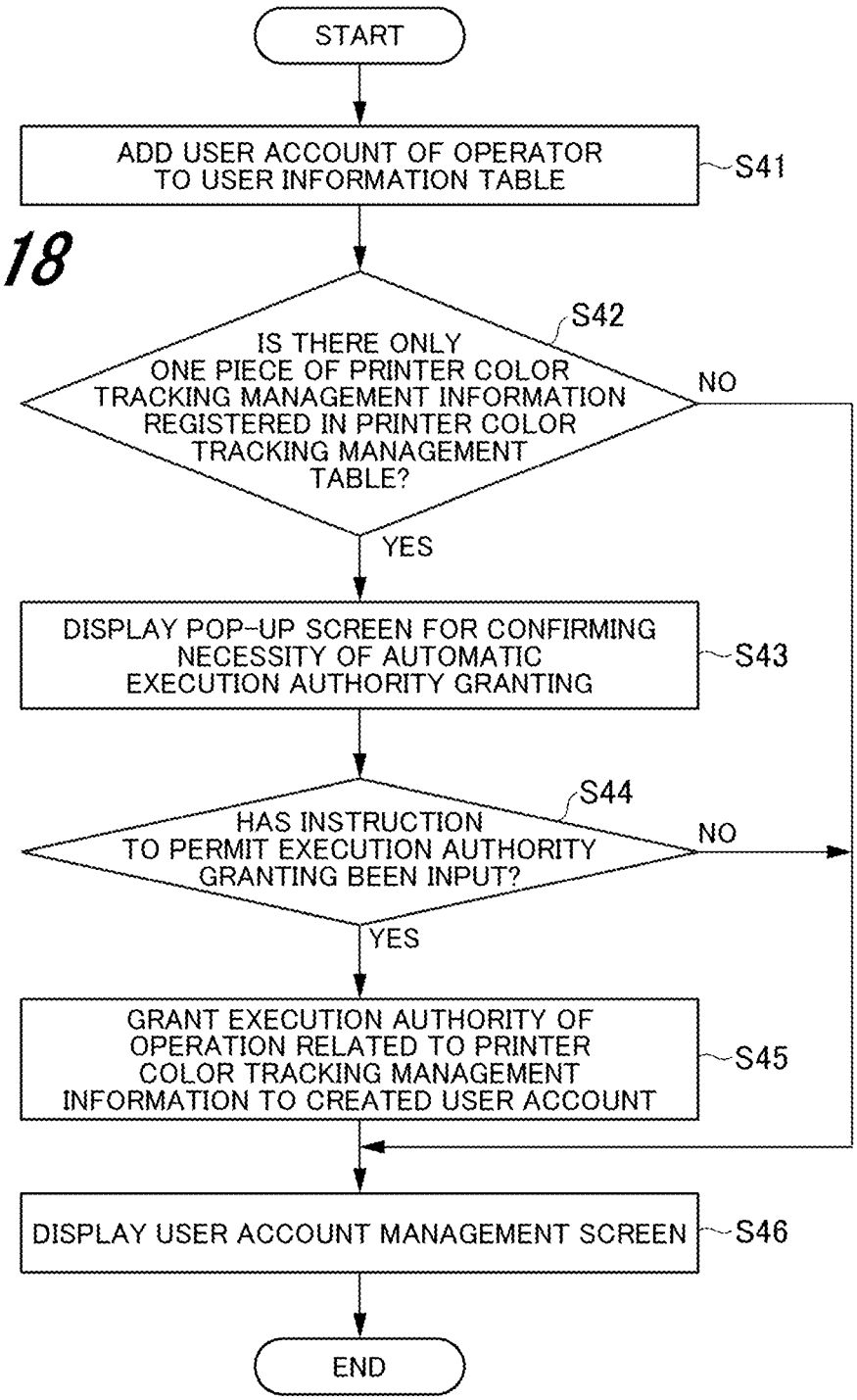
FIG. 18 is a flowchart illustrating an example of a procedure of granting processing of execution authority to a user in a case where there is one registration of the printer color tracking management information according to a first modification of the present invention.

FIG. 18 is a flowchart illustrating an example of a procedure of granting processing of the execution authority to the user according to a first modification. First, the user account of the operator is added to the user information table T2 (see FIG. 3) (or the user information table T2' (see FIG. 6)) on the basis of the operation by the administrator (step S41).

Next, the printer color tracking management information management part 107 determines whether there is only one piece of printer color tracking management information registered in the printer color tracking management information table T4 (see FIG. 5) (step S42).

When it is determined in step S42 that there is only one piece of registered printer color tracking management information (in a case where a determination in step S42 is YES), a pop-up screen for confirming a necessity of automatic execution authority granting is displayed on the user account management screen Sc3 (see FIG. 11) (step S43). An example of the user account management screen Sc3 on which the pop-up screen is displayed will be described with reference to FIG. 19.

For example, in a case where an administrator having the user ID "J-smith" registers the user account with the user ID "J-doe2", it is assumed that the printer color tracking management information registered at that time is only one of "Color Tracking Information 2". In this case, on the user account management screen Sc3, the pop-up screen to confirm whether to grant the user account with the user ID "J-doe2" the execution authority of the operation related to the printer color tracking management information of "Color Tracking Information 2" is displayed.

Next, the printer color tracking management information management part 107 determines whether an instruction to permit automatic granting of the execution authority has been input to the pop-up screen (step S44). When it is determined in step S44 that the instruction for the permission has been input (in a case where a determination in step S44 is YES), the printer color tracking management information management part 107 grants the user account added in step S41 the execution authority of the operation related to the printer color tracking management information (step S45).

After the processing in step S45, when the determination in step S42 is NO, or when the determination in step S44 is NO, the user account management screen Sc3 is displayed on the display of the client PC (not illustrated) (step S46). After the processing in step S46, the procedure of the granting processing of the execution authority to the user ends.

FIG. 19 is a diagram illustrating a configuration example of the user account management screen Sc3 on which the pop-up screen is displayed. A pop-up screen Sc5 is displayed on the user account management screen Sc3 illustrated in FIG. 19.

On the pop-up screen Sc5, a message "We have created an account for J-doe2. There is only one piece of printer color tracking information. Would you like to grant authority to this color tracking information?" is displayed, and the corresponding printer color tracking information is displayed below the message. In the example illustrated in FIG. 19, the printer color tracking management information of "Color Tracking Information 2" is displayed. A YES button Bn6 and a NO button Bn7 are arranged in the lower right of the pop-up screen Sc5.

When the YES button Bn6 is pressed by the user in a state where the pop-up screen Sc5 is displayed, the printer color tracking management information is associated with the user account. In other words, the execution authority of the operation related to the printer color tracking management information is granted to the user account. On the other hand, in a case where the NO button Bn7 is pressed, the execution authority of the operation related to the printer color tracking management information is not granted to the user account.

By performing such control by the printer color tracking management information management part 107, in a case where only one piece of printer color tracking management information is registered at the time of registration of the user account, the execution authority of the operation related to the printer color tracking management information is easily and reliably granted to the user account.

[Second Modification]

Further, for example, the color management server 1 may analyze a tendency of the colorimetry using the information stored in the storage 14 (see FIG. 1) and notify the user such as the operator of a result of the analysis.

FIG. 20 is a diagram illustrating a configuration example of the colorimetric history data D1 according to a second modification. In the colorimetric history data D1 illustrated in FIG. 20, it is recorded that the colorimetric result with the colorimetric ID "106" was "Fail", and it is recorded that the colorimetric result with the colorimetric ID "107" performed subsequently was "Pass". This indicates that since the colorimetric result of the colorimetric ID "106" was "Fail", the color adjustment was performed in the printer of "Printer B", and the chart was printed again, so that the colorimetric result of the chart became "Pass".

Further, focusing on the colorimetric history of "Color Tracking Information 3" before the colorimetric ID "95", it is recognized that the colorimetric results of the colorimetric IDs "43" and "78" are both "Fail." In addition, it can be seen that the colorimetry with any colorimetric ID is performed on Sunday. From this, it can be seen that the colorimetry of the chart printed using the color management target value and the printer managed by the printer color tracking management information of "Color Tracking Information 3" tends to produce the colorimetric result of "Fail" on Sunday for some reason.

Therefore, on the basis of such a result of tendency analysis, by sending a message notifying this tendency to a contact address such as the email associated with the user ID of the user who has performed the corresponding colorimetry, the operator can take some measures. For example, if the message prompting the user having the user ID "Y-hanako" to perform the color adjustment at a stage prior to the chart printing is transmitted or a pop-up message is displayed when the user logs in to the color management server 1 before starting the operation on Sunday, there is a high possibility that the colorimetric result of "Fail" that tends to occur every Sunday can be prevented in advance.

Such a tendency notification can be performed, for example, on the basis of contents described in a scheduler by providing the scheduler and the like that notifies the tendency (hereinafter referred to as the tendency notification scheduler). FIG. 21 is a diagram illustrating a configuration example of a tendency notification scheduler Sd.

As illustrated in FIG. 21, in the tendency notification scheduler Sd, an item of days of the week and an item of the printer color tracking management information are associated with each other. In the example illustrated in FIG. 21, the printer color tracking management information is indicated only by a numerical value such as "3" for "Color Tracking Information 3." However, the present invention is not limited thereto, and may be managed by the name itself of the printer color tracking management information, other name, a symbol, or the like.

The tendency notification scheduler Sd illustrated in FIG. 21 indicates that a notification day of the tendency related to the printer color tracking management information of "Color Tracking Information 3" is Sunday. The tendency notification to the user can be realized, for example, by providing a tendency notification flag (not illustrated) and the like indicating that a notification is necessary in association with the user account, and turning on the tendency notification flag in the user account to be notified.

Then, the printer color tracking management information management part 107 sends the tendency notification message to the email address of the user account in which the tendency notification flag is on at any timing before the start of the operation on a day of the week on which the tendency notification should be performed. Further, the printer color tracking management information management part 107 performs the tendency notification by pop-up notification when the user of the user account logs in to the color management server 1. Note that both the transmission of the tendency notification message to the email address and the pop-up notification may be performed, and only one of them may be performed.

Figure 22:
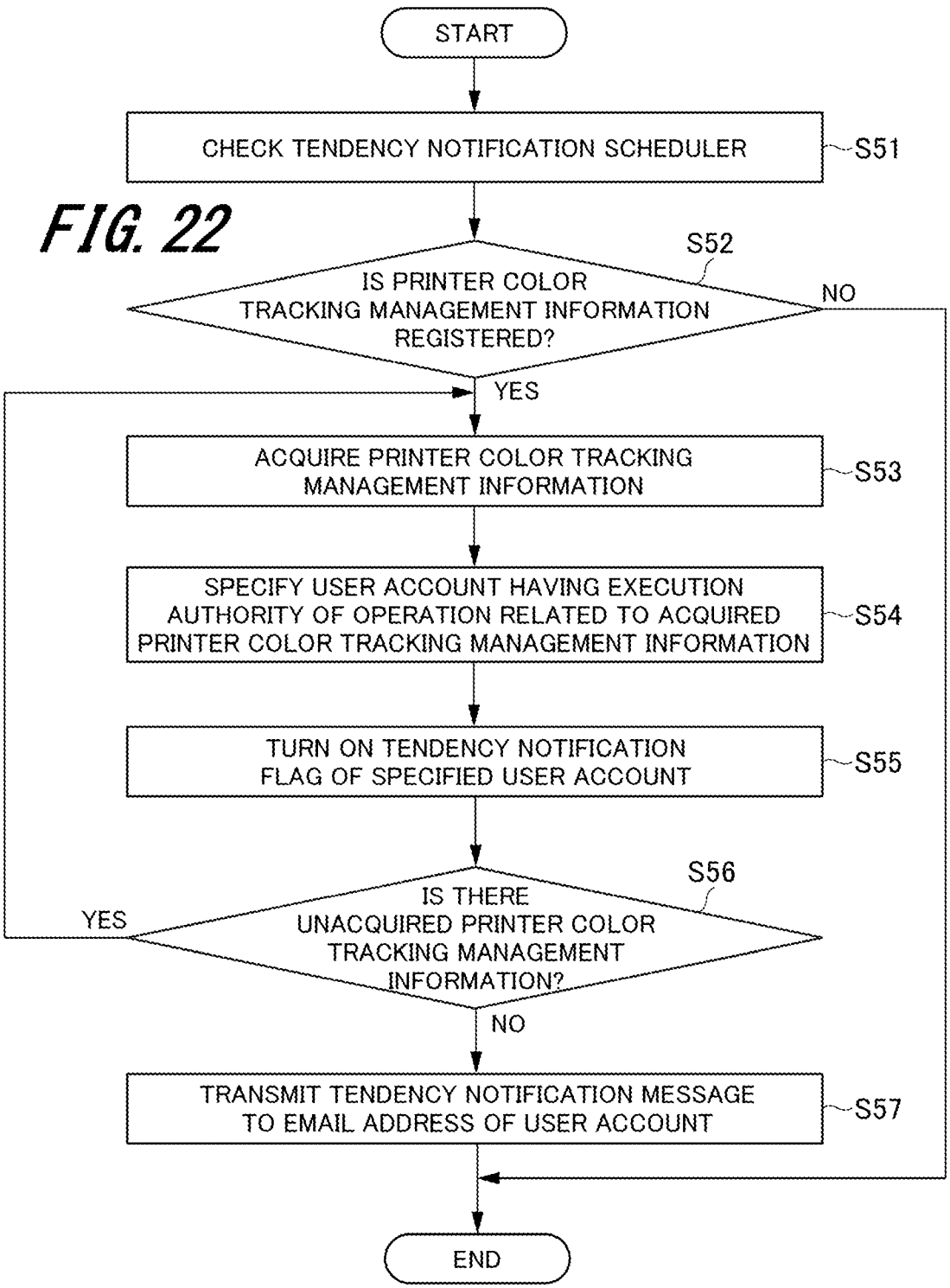
FIG. 22 is a flowchart illustrating an example of a procedure of a tendency notification method (1) by the color management server according to the second modification of the present invention.

FIG. 22 is a flowchart illustrating an example of a procedure of a tendency notification method (1) by the color management server 1.

First, the printer color tracking management information management part 107 of the color management server 1 checks the tendency notification scheduler Sd (see FIG. 21) at a predetermined timing and the like (step S51). Next, the printer color tracking management information management part 107 determines whether the printer color tracking management information is registered in the tendency notification scheduler Sd (step S52). As in the example illustrated in FIG. 21, when "3" (Color Tracking Information 3) is written in the item of Sunday, a determination in step S52 is YES.

When it is determined in step S52 that the printer color tracking management information is not registered (in a case where the determination in step S52 is NO), the color management server 1 ends tendency notification processing. On the other hand, when it is determined in step S52 that the printer color tracking management information is registered (in a case where the determination in step S52 is YES), the printer color tracking management information management part 107 acquires the printer color tracking management information registered in the tendency notification scheduler Sd (step S53). In the example illustrated in FIG. 21, the printer color tracking management information management part 107 acquires the printer color tracking management information of "Color Tracking Information 3".

Next, the printer color tracking management information management part 107 specifies a user account having the execution authority of the operation related to the printer color tracking management information acquired in step S53 (step S54). For example, in the printer color tracking management information table T4 (see FIG. 5), the user account associated with "Color Tracking Information 3" acquired from the tendency notification scheduler Sd is the user account having the user ID "Y-hanako". Therefore, in step S54, the printer color tracking management information management part 107 specifies the user account with the user ID "Y-hanako".

Next, the printer color tracking management information management part 107 turns on the tendency notification flag (not illustrated) of the user account specified in step S54 (step S55). Next, the printer color tracking management information management part 107 determines whether there is unacquired printer color tracking management information (step S56). As in the example illustrated in FIG. 21, when the number of pieces of the printer color tracking management information registered in the tendency notification scheduler Sd is one ("Color Tracking Information 3"), a determination in step S56 is NO.

When it is determined in step S56 that there is unacquired printer color tracking management information (in a case where the determination in step S56 is YES), the printer color tracking management information management part 107 returns to step S53 and continues the processing. On the other hand, when it is determined in step S56 that there is no unacquired printer color tracking management information (in a case where the determination in step S56 is NO), the printer color tracking management information management part 107 transmits the tendency notification message to the email address of the user account specified in step S54 (step S57). After the processing in step S57, the tendency notification method (1) by the color management server 1 ends.

FIG. 23 is a flowchart illustrating an example of a procedure of a tendency notification method (2) by the color management server 1.

First, the printer color tracking management information management part 107 of the color management server 1 determines whether a login to the color management server 1 by the user (the operator) has been detected (step S61).

When it is determined in step S61 that the login has not been detected (in a case where a determination in step S61 is NO), the determination in step S61 is repeated.

On the other hand, when it is determined in step S61 that the login has been detected (in a case where the determination in step S61 is YES), the printer color tracking management information management part 107 determines whether the tendency notification flag associated with the user is on (step S62). When it is determined in step S62 that the tendency notification flag is on (in a case where a determination in step S62 is YES), the printer color tracking management information management part 107 displays a tendency notification pop-up message Pm (see FIG. 24 described later) via the UI controller 108a (see FIG. 1) (step S63).

Next, the printer color tracking management information management part 107 displays the printer color tracking management screen Sc2 (see FIG. 10) on the display of the client PC (not illustrated) via the UI controller 108a (step S64). On the other hand, when it is determined in step S62 that the tendency notification flag is off (in a case where a determination in step S62 is NO), the printer color tracking management information management part 107 performs the processing of step S64. After the processing in step S64, the tendency notification process (2) by the color management server 1 ends.

FIG. 24 is a diagram illustrating an example of the printer color tracking management screen Sc2 on which the tendency notification pop-up message Pm is displayed.

As illustrated in FIG. 24, the tendency notification pop-up message Pm is displayed on the printer color tracking management screen Sc2. In the tendency notification pop-up message Pm, a message "Welcome, Hanako Yamada. 'Color Tracking Information 3' may not pass currently. Color adjustment of the machine is recommended before performing color verification." is displayed. Further, below the message, it is indicated that the color management target value managed as the printer color tracking management information "Color Tracking Information 3" is "JapanColor Target Setting", and the printer is "Printer B".

By performing such processing by the color management server 1, the user (the operator) can know that there is a high possibility that the color verification to be performed after the login will not pass, and can take measures such as performing the color adjustment before performing the color verification. As a result, it is possible to reduce a probability of occurrence of Fail in the color verification operation managed by the printer color tracking management information.

[Other Modifications]

Further, for example, in the embodiment described above, the example has been described in which the color management server 1 performs the color management of the printers in the printing company, but the present invention is not limited thereto. The color management server 1 according to the present invention may share information on the color management target values between different companies such as a printing company and a subcontract printing company of the printing company.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

1 . . . color management server
10 . . . color management part
11 . . . controller
104 . . . printer information management part
105 . . . user information management part
106 . . . color management target value management part
107 . . . printer color tracking management information management part
108a . . . UI controller
D1 colorimetric history data
D2 . . . printer color tracking information-colorimetric information correspondence data
T1 . . . printer information table
T2, T2' . . . user information table
T3 . . . color management target value table
T4 . . . printer color tracking management information table

The invention claimed is:

1. A color management device that performs color management associating a color management target value as a reference to be satisfied by a colorimetric result by a colorimeter with at least one image former, the color management device comprising
a management part that manages information on a user who performs a color verification operation using the color management target value in association with correspondence information in which the image former and the color management target value are managed in association with each other.

2. The color management device according to claim 1, wherein
when there are a plurality of the color management target values with which the user performs the color verification operation, the management part manages a plurality of pieces of the correspondence information in association with the user.

3. The color management device according to claim 2, wherein
the management part performs control to display only the correspondence information associated with the user who logs in to the color management device on a correspondence information display screen displaying the correspondence information.

4. The color management device according to claim 3, wherein
the management part manages an expiration date in association with an account of the user, and does not display the correspondence information associated with the user on the correspondence information display screen for a user who logs in to the color management device at a time when the expiration date has passed.

5. The color management device according to claim 4, wherein
the management part manages the correspondence information and history information of a colorimetric result of printed matter by the image former managed in the correspondence information in association with each other.

6. The color management device according to claim 1, wherein
the management part notifies, based on history information of the colorimetric result, the user associated with the correspondence information with which analysis shows that the colorimetric result tends to fail to satisfy the reference, of information related to a tendency analysis result.

7. The color management device according to claim 6, wherein
the information related to the tendency analysis result includes a notification that prompts the user to perform color adjustment before performing the color verification operation.

8. A color management method by a color management device that performs color management associating a color management target value as a reference to be satisfied by a colorimetric result by a colorimeter with at least one image former, the method comprising
managing information on a user who performs a color verification operation using the color management target value in association with correspondence information in which the image former and the color management target value are managed in association with each other.

9. A non-transitory recording medium storing a computer readable program, the program that can be executed by a computer constituting a color management device that performs color management associating a color management target value as a reference to be satisfied by a colorimetric result by a colorimeter with at least one image former, the program causing the computer to perform
managing information on a user who performs a color verification operation using the color management target value in association with correspondence information in which the image former and the color management target value are managed in association with each other.

* * * * *